United States Patent
Shimazu et al.

(10) Patent No.: US 7,739,790 B2
(45) Date of Patent: Jun. 22, 2010

(54) ELECTRON-EMITTING DEVICE MANUFACTURING METHOD, ELECTRON SOURCE MANUFACTURING METHOD, IMAGE-FORMING APPARATUS MANUFACTURING METHOD, AND INFORMATION DISPLAYING AND PLAYING APPARATUS MANUFACTURING METHOD

(75) Inventors: Akira Shimazu, Kanagawa (JP); Tsuyoshi Takegami, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 340 days.

(21) Appl. No.: 11/748,118

(22) Filed: May 14, 2007

(65) Prior Publication Data

US 2007/0209192 A1    Sep. 13, 2007

Related U.S. Application Data

(62) Division of application No. 10/986,393, filed on Nov. 12, 2004, now Pat. No. 7,249,990.

(30) Foreign Application Priority Data

Dec. 1, 2003   (JP) .............................. 2003-401421

(51) Int. Cl.
*H05K 3/02*   (2006.01)

(52) U.S. Cl. .............................. 29/847; 29/831; 29/842; 29/846; 29/854; 445/24; 445/25; 445/50; 445/51; 313/293; 313/300; 313/304; 313/495; 313/497

(58) Field of Classification Search .................. 29/846, 29/831, 842, 854; 445/24, 25, 50, 51; 313/293–304, 313/495–497
See application file for complete search history.

(56) References Cited

U.S. PATENT DOCUMENTS

| | | | |
|---|---|---|---|
| 5,831,382 A | 11/1998 | Bilan et al. | |
| 5,902,165 A | 5/1999 | Levine et al. | 445/24 |
| 6,064,145 A | 5/2000 | Lee | |
| 6,288,485 B1 | 9/2001 | Takegami et al. | 313/495 |
| 6,346,773 B1 | 2/2002 | Takegami | 315/169.1 |

(Continued)

FOREIGN PATENT DOCUMENTS

CN    1381989 A    11/2002

(Continued)

OTHER PUBLICATIONS

Chinese Office Action and its partial English translation dated Oct. 19, 2007, regarding Application No. 200410097886.2.

*Primary Examiner*—Derris H Banks
*Assistant Examiner*—Azm Parvez
(74) *Attorney, Agent, or Firm*—Fitzpatrick, Cella, Harper & Scinto

(57) ABSTRACT

Provided is an electron-emitting device using a carbon fiber as an electronic member. A carbon fiber through which a cathode electrode and a control electrode are short-circuited is removed to obtain an electron-emitting device having a uniform electron emission characteristic. A first electrode including a plurality of fibers each containing carbon and a second electrode are prepared. Then, a voltage is applied between the first electrode and the second electrode with a state where a potential of the first electrode becomes higher than a potential of the second electrode to remove a carbon fiber through which the first electrode and the second electrode are short-circuited.

11 Claims, 12 Drawing Sheets

U.S. PATENT DOCUMENTS

| | | |
|---|---|---|
| 6,423,583 B1 | 7/2002 | Avouris et al. .............. 438/132 |
| 6,780,075 B2 | 8/2004 | Okamoto et al. .............. 445/50 |
| 6,848,962 B2 * | 2/2005 | Kitamura et al. .............. 445/24 |
| 6,858,990 B2 | 2/2005 | Tsukamoto .............. 315/169.1 |
| 6,891,320 B2 | 5/2005 | Nakamoto .................. 313/311 |
| 2001/0006869 A1 | 7/2001 | Okamoto et al. .............. 445/51 |
| 2001/0024078 A1 * | 9/2001 | Dimitrijevic et al. ........ 313/311 |
| 2002/0031972 A1 | 3/2002 | Kitamura et al. ................ 445/3 |
| 2002/0060514 A1 * | 5/2002 | Nakamoto .................. 313/311 |
| 2003/0073371 A1 | 4/2003 | Iwaki .......................... 445/24 |
| 2003/0082981 A1 | 5/2003 | Takegami et al. .............. 445/6 |
| 2003/0161942 A1 | 8/2003 | Arai et al. ..................... 427/77 |

FOREIGN PATENT DOCUMENTS

| | | |
|---|---|---|
| CN | 1433039 A | 7/2003 |
| JP | 2001-180920 | 7/2001 |
| JP | A 2002-150929 | 5/2002 |
| JP | A 2002-157951 | 5/2002 |
| JP | 2003-77388 | 3/2003 |

* cited by examiner

FIBER AXIS
DIRECTION

FIBER AXIS
DIRECTION

ELECTRON-EMITTING DEVICE MANUFACTURING METHOD, ELECTRON SOURCE MANUFACTURING METHOD, IMAGE-FORMING APPARATUS MANUFACTURING METHOD, AND INFORMATION DISPLAYING AND PLAYING APPARATUS MANUFACTURING METHOD

CROSS REFERENCE TO RELATED APPLICATIONS

This application is a division of U.S. application Ser. No. 10/986,393, filed on Nov. 12, 2004. The entire disclosure of that parent application is incorporated by reference herein.

BACKGROUND OF THE INVENTION

1. Field of the Invention

The present invention relates to a method of manufacturing an electron-emitting device, a method of manufacturing an electron source using the electron-emitting device, and a method of manufacturing an image-forming apparatus using the electron source. The present invention further relates to a method of manufacturing an information displaying and playing apparatus such as a flat television capable of displaying and playing various signals for television broadcasting, teletext, satellite broadcasting, cable television broadcasting, and the like.

2. Related Background Art

In recent years, as disclosed in Japanese Patent Application Laid-Open No. 2002-150929 (corresponding to US 2002031972 A), Japanese Patent Application Laid-Open No. 2001-180920 (corresponding to US 2001006869 A), and U.S. Pat. No. 6,423,583 B, electronic devices using a fiber containing carbon (carbon fiber), such as a carbon nanotube have been researched actively.

SUMMARY OF THE INVENTION

Higher resolution has been required for a flat panel display using an electron source in which a large number of field emission type (FE type) electron-emitting devices are arranged. In order to improve the resolution, an allowable size of an electron-emitting device corresponding to one phosphor (sub-pixel) is reduced.

A field emission type electron-emitting device using carbon fibers as electron-emitting materials generally has as constituent members a cathode electrode on which the carbon fibers are located and a control electrode located at a distance from the cathode electrode. The control electrode may include an electrode for extracting electrons from the carbon fibers or an electrode for controlling the modulation and stop of electrons emitted from the carbon fibers. An electrode for focusing (beam-shaping) an emitted electron beam is further used in some cases.

Examples of a method of locating carbon fibers on the cathode electrode include (1) a method involving applying a paste containing carbon fibers such as carbon nanotubes onto the cathode electrode by means of a printing method or the like and heating the paste to remove a solvent and the like in the paste and (2) a method involving locating a catalyst on the cathode electrode and then heating the cathode electrode in a gas containing raw materials of carbon fibers to allow CVD growth of the carbon fibers on the cathode electrode.

Even when any method is used, it is hard to uniformly control the length and shape of each of the carbon fibers located on the cathode electrode. Of course, according to the above-mentioned method using the paste, when carbon fibers having high shape uniformity are used in advance as the carbon fibers in the paste, it is possible to reduce a difference between shapes. However, the difference does not become essentially zero and a cost increases. Even in the CVD growing method, it is possible to reduce a difference between shapes by suitably controlling a carbon fiber growth condition. However, the difference does not become essentially zero and a cost also increases.

As described above, in the case of the field emission type electron-emitting device in which the plurality of carbon fibers are located on each cathode electrode, it is essentially hard to eliminate a difference between shapes of the respective carbon fibers. In order to satisfy the requirement of the resolution improvement, an allowable area of an electron-emitting device has been reduced. Therefore, there is the case where the cathode electrode and the control electrodes (an electrode for extracting electrons from the carbon fibers and/or an electrode for controlling the modulation and stop of electrons emitted from the carbon fibers) located adjacent to the cathode electrode are short-circuited through a carbon fiber.

In an electron-emitting device having a portion short-circuited through a carbon fiber, a leak current concentratedly flows into the carbon fiber, so that the electron emission significantly reduces. In addition, even when a low voltage is applied between the cathode electrode and the control electrode, a current flows, so that power consumption increases. As a result, performance satisfactory to the electron-emitting device is not obtained.

The present invention has been made to solve the above-mentioned problems. An object of the present invention is to provide a method of manufacturing a field emission type electron-emitting device using carbon fibers in which a cathode electrode in which a plurality of carbon fibers are arranged and a control electrode located adjacent to the cathode electrode are not short-circuited through the carbon fibers. As a result, there are provided an electron-emitting device manufacturing method, an electron source manufacturing method, and an image-forming apparatus manufacturing method with which an electron-emitting device having a superior electron emission characteristic, an electron source, and an image-forming apparatus having a stable and uniform display characteristic can be easily manufactured.

According to a first aspect of the present invention, there is provided an electron-emitting device manufacturing method, including:

a first step of preparing a first electrode including a plurality of fibers each containing carbon and a second electrode located at a distance from the first electrode; and a second step of allowing a current to flow into one or more of the fibers short-circuiting between the first and second electrodes, thereby removing the one or more of the fibers short-circuiting between the first and second electrodes.

According to the first aspect of the present invention, the electron-emitting device manufacturing method includes the following feature as a preferred mode.

The first step includes a step of applying a voltage between the first electrode and the second electrode.

The step of applying the voltage between the first electrode and the second electrode is a step of applying a potential higher than a potential of the second electrode to the first electrode.

The second step is performed in an atmosphere containing a gas which reacts with the fibers each containing carbon.

The gas which reacts with the fibers each containing carbon includes at least one of $O_2$, $H_2O$, and $CO$.

According to a second aspect of the present invention, there is provided a method of manufacturing an electron-emitting device which includes a plurality of fibers each containing carbon on a first electrode and emits an electron by applying a potential higher than a potential applied to the first electrode to a second electrode opposed to the first electrode, including:

a first step of preparing the first electrode including the plurality of fibers each containing carbon and the second electrode located at a distance from the first electrode; and a second step of applying a potential higher than a potential of the second electrode to the first electrode.

According to the second aspect of the present invention, the electron-emitting device manufacturing method includes the following feature as a preferred mode.

The second step is performed in an atmosphere containing a gas which reacts with the fibers each containing carbon.

The gas which reacts with the fibers each containing carbon includes at least one of $O_2$, $H_2O$, and CO.

According to a third aspect of the present invention, there is provided a method of manufacturing an electron source including a plurality of electron-emitting devices connected with a first electrode and a second electrode, each of the plurality of electron-emitting devices having a plurality of fibers each containing carbon, including:

a first step of preparing a plurality of units, each of which includes a first electrode having a plurality of fibers each containing carbon and a second electrode;

a second step of detecting, of the plurality of units, a unit in which the first electrode and the second electrode are short-circuited through a fiber containing carbon; and a third step of removing the fiber containing carbon through which the first electrode and the second electrode are short-circuited in the unit in which the first electrode and the second electrode are short-circuited through the fiber containing carbon, of the plurality of units.

According to the third aspect of the present invention, the electron source manufacturing method includes the following feature as a preferred mode.

The third step includes a step of applying a voltage between the first electrode and the second electrode.

The step of applying the voltage between the first electrode and the second electrode is a step of applying a potential higher than a potential of the second electrode to the first electrode.

The third step is performed in an atmosphere containing a gas which reacts with the fibers each containing carbon.

The gas which reacts with the fibers each containing carbon includes at least one of $O_2$, $H_2O$, and CO.

According to a fourth aspect of the present invention, there is provided a method of manufacturing an image display apparatus including an electron source and a light emitting member that emits light by impinging on an electron emitted from the electron source, in which the electron source is manufactured by means of the method according to the third aspect of the present invention.

According to a fifth aspect of the present invention, there is provided a method of manufacturing an image display apparatus including an electron source and a light emitting member, the electron source including a plurality of electron-emitting devices, the light emitting member emitting light by impinging on an electron emitted from each of the electron-emitting devices, in which each of the electron-emitting devices is manufactured by means of the method according to the first or second aspect of the present invention.

According to a sixth aspect of the present invention, there is provided an information displaying and playing apparatus including a receiver for outputting at least one of video information, character information, and voice information, which are included in a received broadcast signal, and an image display apparatus connected with the receiver, in which the image display apparatus is manufactured by means of the method according to the fourth or fifth aspect of the present invention.

The method of the present invention includes the step of removing the carbon fiber through which the electrodes are short-circuited. Therefore, it is possible to provide an electron-emitting device in which a leak current caused by short-circuit is inhibited to improve an electron emission characteristic. In addition, according to the present invention, it is possible to provide an electron-emitting device having a stable and preferable electron emission characteristic. As a result, waste power consumption in driving can be suppressed.

According to the present invention, even in the cases of an electron source including a plurality of electron-emitting devices and an image display apparatus including a plurality of electron-emitting devices, the electron emission characteristic of each of the electron-emitting devices can be improved. Therefore, it is possible to provide an image display apparatus and an information displaying and playing apparatus such as a television, in which the contrast of an image can be preferably expressed, there is no defective pixel, a display characteristic is stable and uniform, and waste power consumption in driving is suppressed.

DESCRIPTION OF THE PREFERRED EMBODIMENTS

Hereinafter, a preferred embodiment mode of the present invention will be illustratively described in detail with reference to the accompanying drawings. Note that the scope of the present invention is not limited to the size, materials, and shapes of constituent parts, relative arrangement thereof, and the like, which are described in this embodiment mode if there are particularly no specific descriptions.

In an electron-emitting device manufactured by means of a manufacturing method of the present invention, a "fiber containing carbon," that is, a "carbon fiber" is used as an electron-emitting material. The fiber containing carbon also translates to a "fiber containing carbon as a main component," a "columnar substance containing carbon as a main component," or a "linear substance containing carbon as a main component." Therefore, typically, the fiber containing carbon indicates a fiber in which the percentage of carbon is 50 atm % or more, preferably, a fiber in which the percentage of carbon is 70 atm % or more, more preferably, a fiber in which the percentage of carbon is 90 atm % or more. When the fiber containing carbon is grown using a catalyst (typically, metal) as described later, the fiber wraps, contains or includes a catalytic material in many cases. Thus, the fiber containing carbon according to the present invention also includes a fiber that wraps the catalytic material and a fiber that contains the catalytic material. Even in the case of the fiber that contains carbon and wraps the metal, the fiber containing carbon according to the present invention indicates a fiber in which the percentage of carbon is 50 atm % or more, preferably, a fiber in which the percentage of carbon is 70 atm % or more, more preferably, a fiber in which the percentage of carbon is 90 atm % or more. When a fiber wraps, includes or contains a material different from carbon, such as the catalytic material, it is preferable that a ratio of the wrapped or included material to carbon of the fiber containing carbon be effectively 20 mass % or less. More specifically, the "carbon fiber" according to the present invention includes an electroconductive carbon fiber such as a carbon nanotube, a graphite nanofiber, or an amorphous carbon fiber. Of them, the graphite nanofiber is most preferable in view of an electron emission characteristic.

Figure 8A:
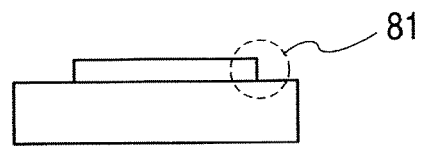
FIGS. 8A, 8B, and 8C are outline views showing a structure of a carbon nanotube.
Figure 8B:
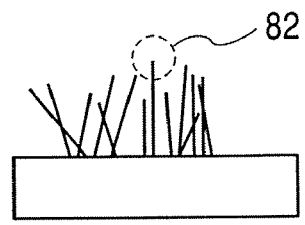
Figure 8C:
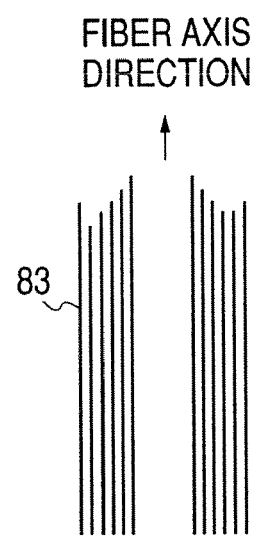
Figure 9A:
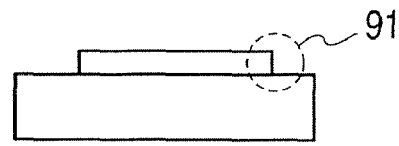
FIGS. 9A, 9B, 9C, and 9D are outline views showing a structure of a graphite nanofiber.
Figure 9B:
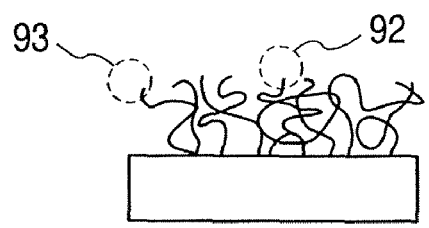
Figure 9C:
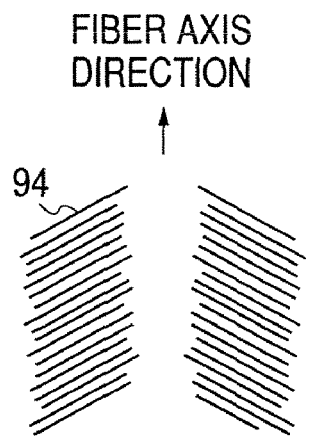
Figure 9D:
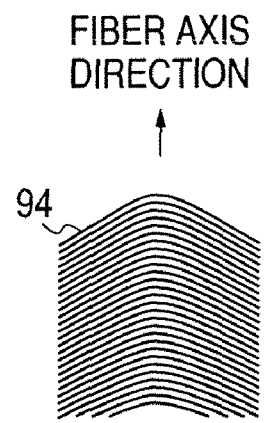

FIGS. 8A to 8C and 9A to 9D show examples of forms of the above-mentioned carbon fiber. FIGS. 8A and 9A show forms which can be observed at optical microscope levels (up to magnification of 1,000 times). FIG. 8B is a partially enlarged view showing an area indicated by reference numeral 81 in FIG. 8A. FIG. 9B is a partially enlarged view showing an area indicated by reference numeral 91 in FIG. 9A. FIGS. 8B and 9B each show a form which can be observed at a scanning electron microscope (SEM) level (up to magnification of 30,000 times). FIGS. 8C, 9C, and 9D are partially enlarged views of FIGS. 8B and 9B. FIG. 8C is a partially enlarged view showing an area indicated by reference numeral 82 in FIG. 8B. FIG. 9C is a partially enlarged view showing an area indicated by reference numeral 92 in FIG. 9B. FIG. 9D is a partially enlarged view showing an area indicated by reference numeral 93 in FIG. 9B. FIGS. 8C, 9C, and 9D each are a schematic view showing a form of carbon which can be observed at a transmission electron microscope (TEM) level (up to magnification of 1,000,000 times). In FIGS. 8C, 9C, and 9D, reference numerals 83 and 94 each denote a graphen.

As shown in FIG. 8C, a carbon fiber in which the graphen 83 has a cylindrical form is called a "carbon nanotube." A carbon fiber composed of a large number of cylinders with a multiple structure is called a "multi-wall nanotube." A carbon fiber composed of a single cylinder is called a "single wall nanotube." In particular, a threshold electric field required for electron emission minimizes in a structure in which the distal end of the tube is open. FIG. 8C shows an example of the multi-wall nanotube.

As shown in FIGS. 9C and 9D, a fiber composed of the graphenes 94 stacked in a direction different from a direction orthogonal to the axis of the fiber (graphemes are arranged such that a c-axis becomes non-perpendicular to a fiber axis direction) is called a "graphite nanofiber." More specifically, the graphite nanofiber indicates a carbon fiber in which the graphenes are stacked in the longitudinal direction (fiber axis direction). In other words, as shown in FIGS. 9A to 9D, the graphite nanofiber is a carbon fiber composed of a plurality of graphenes which are stacked and arranged non-parallel to the fiber axis direction. In contrast to this, the carbon nanotube is a carbon fiber in which graphenes are located so as to surround (cylindrically) the longitudinal direction (fiber axis direction). In other words, the carbon nanotube is a carbon fiber in which (plural) graphenes are located substantially parallel to the fiber axis. That is, in the case of the above-mentioned carbon nanotube, the c-axis (direction in which plural graphenes are stacked or direction perpendicular to a graphen plane) is substantially perpendicular to the fiber axis direction (longitudinal direction of the fiber). On the other hand, in the case of the graphite nanofiber, the c-axis (direction in which graphenes are stacked or direction perpendicular to the graphen plane) is non-perpendicular (typically, parallel) to the fiber axis direction (longitudinal direction of the fiber).

When an angle formed between the fiber axis and the graphen plane is substantially 90° (the fiber axis is parallel to or substantially parallel to the c-axis), the graphite nanofiber is called a "platelet type" graphite nanofiber. In other words, the platelet type graphite nanofiber has a structure in which a large number of graphenes are stacked as in cards. In contrast to this, as shown in FIGS. 9C and 9D, a graphite nanofiber having a form in which an angle of a plane of the graphen 94 with respect to the fiber axis direction is smaller than 90° and larger than 0° is called a "herringbone type" graphite nanofiber. In the "herringbone type," there is also a form in which cup-shaped graphenes having holes are stacked. As shown in FIG. 9D, the "herringbone type" also includes a graphite nanofiber having a form in which books which are open are stacked (form in which V-shaped graphenes are stacked).

There is the case where the center of the fiber axis and its vicinity in the herringbone type is hollow or filled with amorphous carbon (spot resulting from a distinct crystal lattice and a contrast image of a lattice are not observed on an electron diffraction image at a TEM level and only a broad ring pattern is observed).

FIG. 9B is a schematic view showing the case where the carbon fiber is grown with a state where the linearity thereof is low. This does not show that each carbon fiber formed by means of the manufacturing method of the present invention has low linearity and does not exclude the carbon fiber having high linearity as shown in FIG. 8B.

Note that one plane of graphite is called a "graphen" or a "graphen sheet." More specifically, graphite includes stacked carbon planes, each of which has equilateral hexagons which are formed by a covalent bond produced by $sp^2$ hybridization of carbon atoms and arranged so as to be laid. An ideal distance between the stacked carbon planes is 3.354 angstroms. Each of the carbon planes is called a "graphen" or a "graphen sheet."

The carbon nanotube and the graphite nanofiber each have an electron-emitting threshold of the order of 1 V/μm to 10 V/μm and are preferably used as electron-emitting materials according to the present invention. In particular, the graphite nanofiber is preferable because it can provide an emission current larger than that in the carbon nanotube. The carbon nanotube and the graphite nanofiber can be separately formed according to a kind of catalyst and a thermal decomposition temperature of a raw gas of the carbon fiber. A carbon fiber having both a carbon nanotube structure and a graphite nanofiber structure can be selectively formed using the same catalyst by temperature control. A carbon fiber having only one of the carbon nanotube structure and the graphite nanofiber structure can be also formed.

When an electron-emitting device is formed using a carbon fiber, a single electron-emitting device includes a plurality of carbon fibers. It is more preferable that a graphite nanofiber is used as a carbon fiber serving as an electron-emitting material. This is because a large electron emission current density can be ensured in an electron-emitting device using a plurality of graphite nanofibers as electron-emitting materials as compared with the case where a carbon nanotube is used.

In contrast to the carbon nanotube and the like, as shown in FIG. 9C, the graphite nanofiber has a minute uneven shape on the surface thereof (side surface of the fiber). As a result, it is expected that electric field concentration is likely to occur and thus electrons are likely to emit from the side surface of the fiber. In addition, the graphite nanofiber has a form in which graphen is extended from the central axis of the fiber to the periphery (surface) of the fiber. Therefore, it is expected that electrons are likely to emit from the side surface of the fiber.

On the other hand, in the case of the carbon nanotube, the fiber side surface thereof fundamentally corresponds to a c-plane and thus is chemically inert and there is no unevenness in contrast to the graphite nanofiber. As a result, it is expected that electrons are not emitted from the fiber side surface. Therefore, it is expected that the graphite nanofiber is preferably used as the carbon fiber for an electron-emitting device.

According to the first aspect, the electron-emitting device manufacturing method of the present invention includes:

a first step of preparing a first electrode including a plurality of carbon fibers and a second electrode located apart from the first electrode; and a second step of allowing a current to flow into, of the plurality of carbon fibers, a carbon fiber through which the first electrode and the second electrode are short-circuited to remove the carbon fiber through which the first electrode and the second electrode are short-circuited.

According to the second aspect, the electron-emitting device manufacturing method of the present invention includes:

a first step of preparing a first electrode including a plurality of carbon fibers and a second electrode located apart from the first electrode; and a second step of applying a potential higher than a potential of the second electrode to the first electrode.

Assume that the first electrode including the plurality of carbon fibers and the second electrode located close to the first electrode are prepared. Then, if there is, of the plurality of carbon fibers, the carbon fiber through which the first electrode and the second electrode are short-circuited, a maximal feature of the electron-emitting device manufacturing method of the present invention is to include the step of "removing" the carbon fiber through which the first electrode and the second electrode are short-circuited.

Note that "removing" in the present invention generally includes complete removal of the carbon fiber that causes short-circuit. Even if a portion of the carbon fiber that causes short-circuit is left, a leak current flowing through the carbon fiber through which the first electrode and the second electrode are short-circuited is preferably reduced to a level at which a substantial problem does not occur.

Thus, "removing" in the present invention also includes, for example, a removal method of removing only a portion of the carbon fiber through which the first electrode and the second electrode are short-circuited, which is in contact with the second electrode to leave the other portion of the carbon fiber that causes short-circuit on the first electrode. Alternatively, "removing" in the present invention includes a removal method of removing a portion between the first electrode and the second electrode of the carbon fiber that causes short-circuit to leave another portion of the carbon fiber that causes short-circuit on each of the second electrode and the first electrode. Further, "removing" in the present invention includes processing for changing, to an insulator, a portion of the carbon fiber or the entire carbon fiber, which is connected between the second electrode and the first electrode.

With respect to a specific example of the removal method of the present invention, for example, energy (such as a laser beam) may be applied from the outside to the carbon fiber that causes short-circuit or a probe of an STM or the like may be made contact with the carbon fiber that causes short-circuit to cause mechanical break or move the carbon fiber that causes short-circuit. For example, a method involving applying a voltage between the first electrode and the second electrode can be employed as another specific example. According to the method involving applying the voltage between the first electrode and the second electrode, a current selectively flows into the carbon fiber that causes short-circuit, so that the carbon fiber that causes short-circuit can be removed by Joule heat caused by the current. The removal using Joule heat typically involves the removal of the carbon fiber that causes short-circuit, which is caused by sublimation thereof. Of course, the present invention is not limited to the sublimation. The carbon fiber that causes short-circuit can be removed by a combination of the above-mentioned manners.

In order to aid the above-mentioned removal method, the method can be also performed in an atmosphere containing a substance which reacts with the carbon fiber. For example, when the voltage applying method is performed in an atmosphere containing a substance which reacts with the carbon fiber, it is possible to more easily remove the carbon fiber that causes short-circuit. This is that the reactive substance contained in the atmosphere and a short-circuit portion short-circuited through the carbon fiber are selectively reacted with each other by heat to remove the carbon fiber in the short-circuit portion. When the removing is performed in the atmosphere containing the reactive substance, energy necessary to remove the short-circuiting carbon fiber can be further reduced. That is, the damage to other preferable carbon fibers (carbon fibers that cause no short-circuit) in the removal can be reduced.

The carbon fiber contains carbon. Therefore, for example, it is expected that the following reactions (1) to (5).

$$C + H_2 \rightarrow H_2\uparrow + CO\uparrow \qquad (1)$$

$$C + 2H_2O \rightarrow 2H_2\uparrow + CO_2\uparrow \qquad (2)$$

$$C + O_2 \rightarrow CO_2\uparrow \qquad (3)$$

$$2C + O_2 \rightarrow 2CO\uparrow \qquad (4)$$

$$C + CO_2 \rightarrow 2CO\uparrow \qquad (5)$$

The above-mentioned reactions (1) to (5) can be used to remove the carbon fiber that causes short-circuit. Therefore, $H_2O$, CO, $O_2$, or the like is effective as the substance which reacts with the carbon fiber. However, the substance which reacts with the carbon fiber is not limited to those.

In the voltage applying method, assume that the polarity of the applied voltage is equal to that at driving of the electron-emitting device (that is, a state where a potential higher than a potential of the first electrode in which the carbon fibers are arranged is applied to the second electrode). In some cases, electrons are emitted according to a voltage value even in the carbon fiber that causes no short-circuit. As a result, there is the case where the carbon fiber that causes no short-circuit is also removed by heat caused by the electron emission current.

Therefore, when the carbon fiber that causes short-circuit is removed by the application of the voltage having the polarity equal to that at driving, it is preferable to perform the removal at a voltage lower than the voltage applied in driving. It is more preferable to use a polarity reverse to that in driving as the polarity of the voltage applied between the first electrode and the second electrode. This corresponds to the second step in the manufacturing method of the present invention according to the second aspect. As described above, when the voltage having the polarity reverse to that in driving is applied, a current flows into only a carbon fiber that causes short-circuit and does not flow into a carbon fiber that causes no short-circuit. As a result, the damage to the carbon fiber that causes no short-circuit can be substantially eliminated. Thus, in the case where the voltage having the polarity reverse to that in driving is applied, the applied voltage has substantially no limit if a discharge breakdown phenomenon does not occur between the first electrode and the second electrode.

When the carbon fiber that causes short-circuit is removed by the application of the voltage, a plurality of pulse voltages may be applied or a voltage continued with time, such as a DC voltage may be applied. When the damage to carbon fibers having preferable electron emission characteristics is to be reduced, it is preferable to increase the applied voltage stepwise from a small value. Therefore, it is preferable to repeatedly apply a pulse voltage so that a peak value (voltage value) increases with time. Although the applied voltage is changed according to a surrounding atmosphere and an interval between the first electrode and the second electrode, the applied voltage is typically in the range of the order of several V to several tens V (typically 5 V to 60 V).

The removal method using the application of the voltage is a simple and very effective method, particularly, in the case where an electron source in which a plurality of electron-emitting device are arranged, an image display apparatus in which a light emitting member such as a phosphor is located as an image display member so as to oppose to the electron source in which the plurality of electron-emitting device are arranged, and the like are formed.

For example, when a voltage is applied to each of the plurality of electron-emitting devices, it is possible to remove a carbon fiber that causes short-circuit in an electron-emitting device in which short-circuit occurs. Of course, it is also possible that a current-voltage characteristic of each of the electron-emitting devices is monitored, an electron-emitting device in which the occurrence of short-circuit is assumed is determined, and a voltage is applied to only the determined electron-emitting device to remove a carbon fiber that causes short-circuit. In the determination, in order to suppress the damage to preferable carbon fibers, a voltage having a polarity reverse to that in driving is preferably applied to each of the electron-emitting devices to monitor the current-voltage characteristic of each of the electron-emitting devices. Thus, the removal method in the present invention also includes a method involving checking the current-voltage characteristic of each of the electron-emitting devices and applying the voltage to only the determined electron-emitting device based on a result by checking to remove the carbon fiber that causes short-circuit.

However, when a very large number of electron-emitting devices are used as in the case of a display, it takes a cost to monitor the characteristic of each of the electron-emitting devices. Therefore, as described above, when the method involving applying the voltage to all electron-emitting devices is used, a reduction in cost can be achieved. In this time, as described above, it is preferable to apply the voltage having the polarity reverse to that in driving. When the voltage having the polarity reverse to that in driving is applied, the influences on the characteristics of the preferable electron-emitting devices can be minimized. In addition, it is unnecessary to control the voltage to each of the electron-emitting devices with high precision in view of voltage drop caused by a resistance of a wiring through which a large number of electron-emitting devices are commonly connected with one another as described later.

As described above, according to the present invention, in the electron-emitting device which includes the first electrode on which the carbon fibers are deposited and the second electrode located close to the first electrode, the electron source using the electron-emitting device, and the image display apparatus using the electron-emitting device, when the carbon fibers are located on the first electrode and then the voltage (preferably, the voltage having the polarity reverse to that in driving) is applied between the first electrode and the second electrode, an electron-emitting device in which the first electrode and the second electrode are not short-circuited through a carbon fiber and electron emission efficiency is high can be surely realized by means of a simple method. According to such a manner, the voltage is applied between the first electrode and the second electrode regardless of whether or not short-circuit occurs in each of the electron-emitting devices (whether or not the first electrode and the second electrode are short-circuited through the carbon fiber). Thus, it is possible to easily and surely realize the electron-emitting device in which the first electrode and the second electrode are not short-circuited through the carbon fiber and the electron emission efficiency is high, the electron source using the electron-emitting device, and the image display apparatus using the electron-emitting device.

For example, when a flat panel display is produced, the above-mentioned removal step may be performed after a step of bonding an electron source substrate to a face plate to form an envelope whose inner portion is maintained to a vacuum (which is called a seal bonding step (and a seal step)). In the electron source substrate, a plurality of electron-emitting devices each having a carbon fiber and wirings for driving the electron-emitting devices are formed. The face plate includes an image display member made of a phosphor or the like. The above-mentioned removal step is preferably performed on the electron source substrate before the seal bonding step. This is preferable because the likelihood of contamination of the inner portion of the flat panel display, which is caused by a reactive gas, evaporated carbon, and the like, is small. The seal bonding can be performed after the characteristics of the respective electron-emitting devices are checked, so that the number of defective panels reduces to improve a yield of panel.

Hereinafter, the electron-emitting device manufacturing method of the present invention will be specifically described using an example of a lateral type electron-emitting device with reference to FIGS. 1A to 1D, 2A, 2B, 3A, and 3B.

Figure 11:
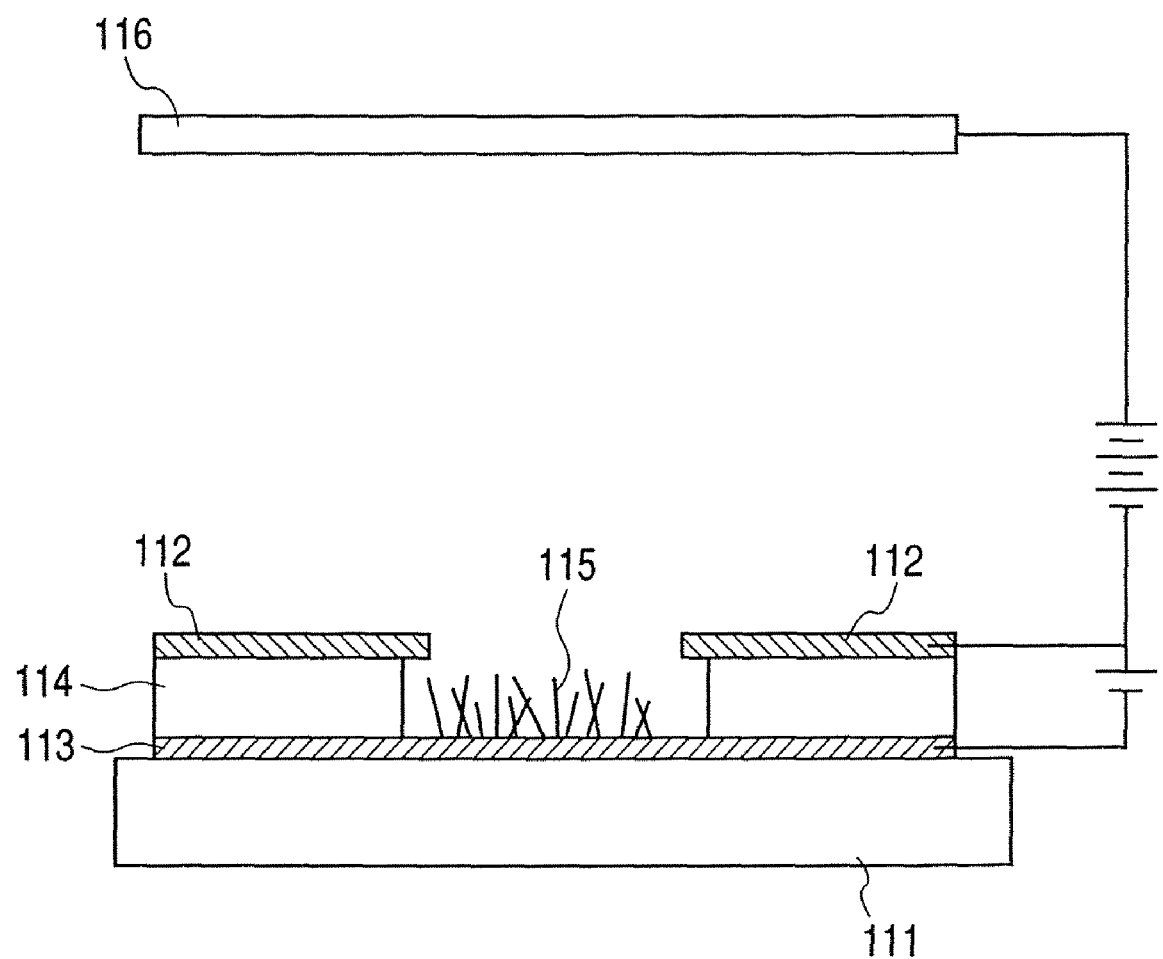
FIG. 11 is a schematic view showing an example of a vertical type electron-emitting device according to the present invention.

Although the example of the lateral type electron-emitting device is shown, the manufacturing method of the present invention can be preferably applied to a vertical type electron-emitting device shown in FIG. 11. The lateral type electron-emitting device is a more preferable form than the vertical type electron-emitting device. The lateral type electron-emitting device is easily manufactured and can be driven at high speed because a capacitance component in driving is small. Note that the "lateral type electron-emitting device" indicates an electron-emitting device having a form in which an electric field is produced in a direction substantially parallel to a substrate surface and electrons are extracted from carbon fibers by using the electric field. On the other hand, the "vertical type electron-emitting device" indicates an electron-emitting device having a form in which an electric field is produced in a direction substantially perpendicular to the substrate surface and electrons are extracted from the carbon fibers by using the electric field.

The vertical type electron-emitting device shown in FIG. 11 includes a cathode electrode 113 and a control electrode 112. A structure having the cathode electrode 113, the control electrode 112, and an anode 116 is called a triode (three-terminal) structure. Carbon fibers 115 can emit electrons at a low electric field strength. Therefore, the present invention can be applied to a vertical type electron-emitting device having a structure in which the control electrode 112 and an insulating layer 114 are omitted in FIG. 11. That is, the present invention can be applied to an electron-emitting device composed of the cathode electrode 113 located on a substrate 111 and the carbon fibers 115 located on the cathode electrode 113. A structure having the cathode electrode 113, the carbon fibers 115, and the anode 116 is called a diode (two-terminal) structure.

As shown in FIG. 11, in the triode structure, there is the case where the control electrode 112 serves as a so-called gate electrode (electrode for extracting electrons from the carbon fibers). As described above, the carbon fibers 115 can emit electrons at a low electric field strength. Therefore, there is the case where electrons are extracted from the carbon fibers by the anode electrode 116 and the control electrode is used to modulate the amount of electrons emitted from the carbon fibers, stop the electrons emitted therefrom, or shape (focus) an emitted electron beam.

Figure 3A:
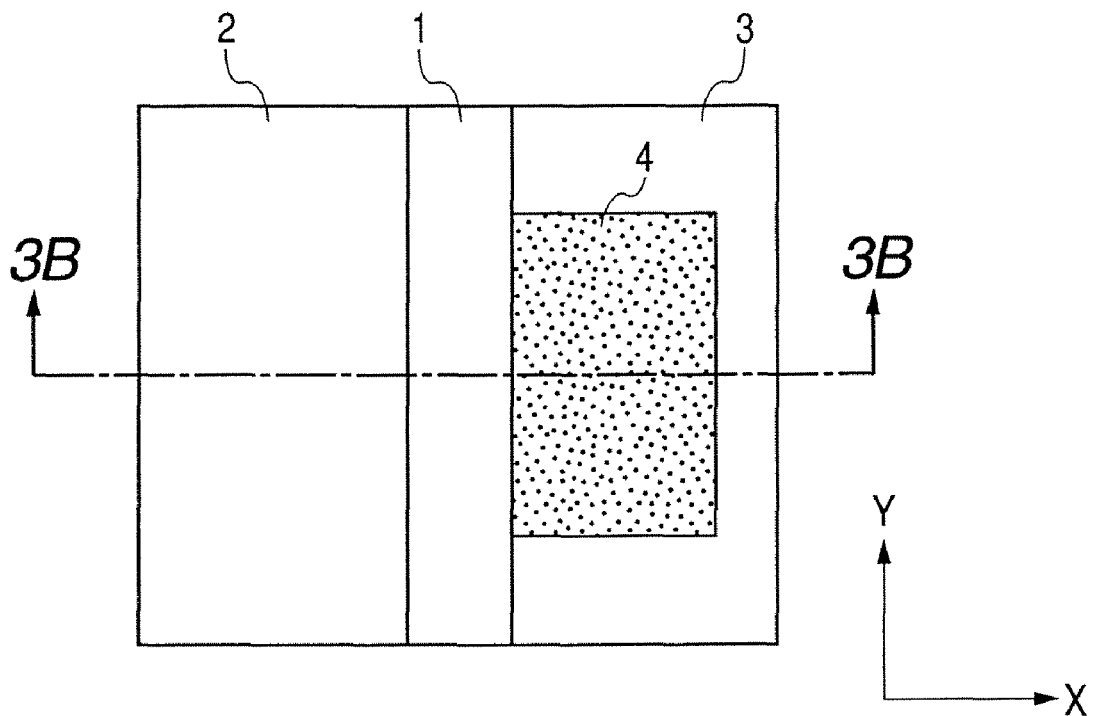
FIGS. 3A and 3B are schematic views showing an example of a lateral type electron-emitting device according to the present invention.
Figure 3B:
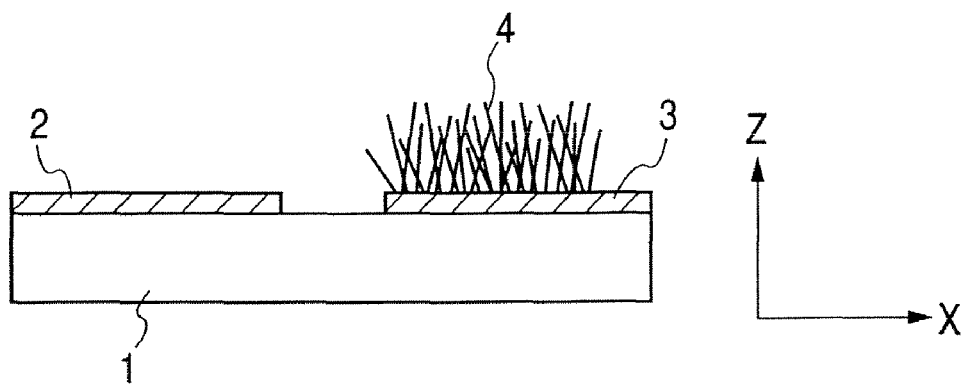

FIG. 3A is a plan view showing the lateral type electron-emitting device and FIG. 3B is a cross sectional view along a 3B-3B line in FIG. 3A. In FIGS. 3A and 3B, the lateral type electron-emitting device includes a substrate (base) 1, a control electrode (second electrode) 2, a cathode electrode (first electrode) 3, and a plurality of carbon fibers 4 serving as electron-emitting materials. The case where the control electrode 2 serves as the so-called gate electrode (electrode for extracting electrons from the carbon fibers 4). As described above in the vertical type electron-emitting device, there is the case where electrons are extracted from the carbon fibers 4 by the anode electrode (not shown) and the control electrode 2 is used to modulate the amount of electrons emitted from the carbon fibers, stop the electrons emitted therefrom, or shape (focus) the emitted electron beam.

FIGS. 1A to 1D are schematic views showing an example of an electron-emitting device manufacturing method according to this embodiment mode. Hereinafter, then example of an electron-emitting device manufacturing method of the present invention will be described in due order with reference to FIGS. 1A to 1D.

(First Step)

Figure 1A:
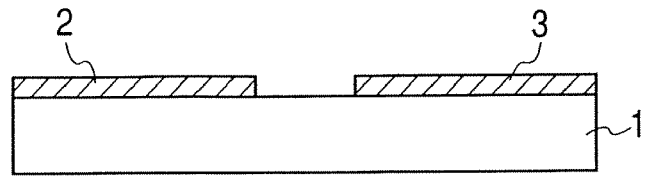
FIGS. 1A, 1B, 1C, and 1D are schematic views showing an example of an electron-emitting device manufacturing method according to the present invention.

The substrate 1 whose surface is sufficiently washed in advance is prepared. It is possible to use as the substrate 1, for example, a quartz glass substrate, a substrate in which the amount of impurity such as Na in the substrate is reduced, a glass substrate in which Na in the substrate is partially substituted for K, a soda lime glass substrate, a substrate obtained by stacking an $SiO_2$ layer on a substrate made of silicon or the like, or a ceramic substrate made of alumina or the like. The second electrode 2 serving as the control electrode and the first electrode 3 serving as the cathode electrode are stacked on the substrate 1 (FIG. 1A).

The first and second electrodes 2 and 3 may be made of an electroconductive material, which is selected as appropriate from, for example, carbon, metal, a metallic nitride, a metallic carbide, a metallic boride, semiconductor, and a metallic compound of semiconductor. It is desirable to use a heat-resistant material such as carbon, metal, a metallic nitride, or a metallic carbide. A thickness of the first and second electrodes 2 and 3 is set to several tens nm to several μm. An interval between the first electrode 2 and the second electrode 3 is set as appropriate to several μm to several hundreds μm. An effective range of the interval is preferably 1 μm or more to 100 μm or less.

(Second Step)

Next, the plurality of carbon fibers 4 are located on the cathode electrode 3.

Hereinafter, an example in the case where a CVD method is used will be described. According to the present invention, in addition to the CVD method, it is possible to use a conventional known method involving locating the plurality of carbon fibers prepared in advance on the cathode electrode 3.

In the conventional known method, for example, the plurality of carbon fibers prepared in advance are mixed with a print paste. The print paste is applied onto the cathode electrode 3 and baked to remove an organic material such as a binder in the print paste. Therefore, the carbon fibers 4 can be located on the cathode electrode 3. When the binder is mixed with metallic particles, electrical contact property between the carbon fibers and the cathode electrode 3 after baking can be improved.

According to the present invention, as described above, graphite nanofibers are preferably used as the carbon fibers 4. In particular, when the graphite nanofiber is used for an electron-emitting device, a large emission current can be obtained at a low electric field, the electron-emitting device can be easily manufactured, and a stable electron emission characteristic can be obtained.

Figure 1B:
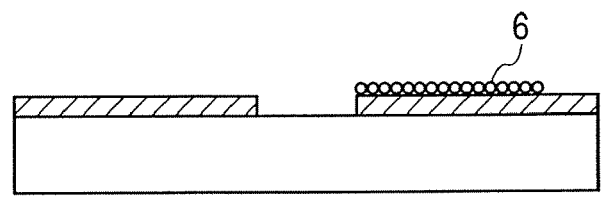

Catalytic particles 6 which have preferably a particle shape are located on the first electrode 3 (FIG. 1B). In a method of locating the catalytic particles 6, for example, dispersions obtained by dispersing the catalytic particles in advance into a dispersion medium (solvent) are prepared. The dispersions are applied onto the first electrode 3 and the solvent is removed by heat decomposition. As a result, a large number of catalytic particles 6 can be located on the first electrode 3. Alternatively, a catalytic layer is formed as a thin film having a thickness of several angstroms to several hundreds of angstroms on the first electrode 3 by means of a sputtering method or the like and then heated for cohering. As a result, a large number of catalytic particles 6 can be located on the first electrode 3.

It is possible to use as a material composing the catalytic particle Fe, Co, Pd, Ni, or an alloy of materials selected from those. In particular, when Pd or Ni is used, a graphite nanofiber can be produced at a low temperature (temperature of 400° C. or higher). Although a temperature necessary to produce a carbon nanotube using Fe or Co is 800° C. or higher, the graphite nanofiber using Pd or Ni can be produced at a low temperature. Thus, it is preferable to use Pd or Ni in view of the influences on other members and a manufacturing cost. In particular, when an alloy of Pd and Co is used, a carbon fiber having a superior electron emission characteristic can be produced.

Figure 1C:
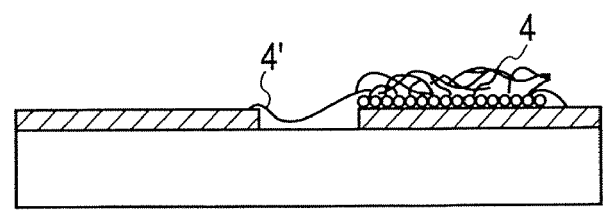

The first electrode 3 on which the catalytic particles 6 are located is heated in a gas containing a raw material of the carbon fibers, so that the plurality of carbon fibers 4 are grown on the first electrode 3 (FIG. 1C). Each substrate 1 is simply heated in the gas containing the raw material of the carbon fibers, so that the carbon fibers can be grown. In this step, of a large number of grown carbon fibers 4, a carbon fiber 4' through which the first electrode 3 and the second electrode 2 are short-circuited as shown in FIG. 1C is produced in some cases.

A gas containing carbon is used as a raw gas for a carbon fiber. A hydrocarbon gas is more preferably used. For example, a hydrocarbon gas such as ethylene, methane, propane, or propylene, a CO gas, a $CO_2$ gas, or the vapor of an organic solvent such as ethanol or acetone can be also used as the gas containing carbon.

(Third Step)

Figure 1D:
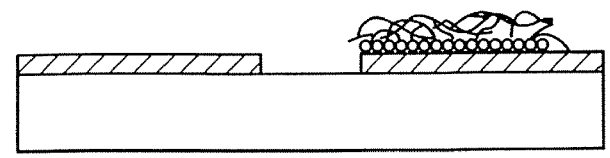

Next, a step of removing the carbon fiber 4' that causes short-circuit, which is the feature of the present invention, is performed (FIG. 1D). With respect to the method of removing the carbon fiber 4' that causes short-circuit, as described above, for example, energy (such as a laser beam) may be applied from the outside to the carbon fiber 4' that causes short-circuit. Alternatively, a probe of an STM or the like may be made contact with the carbon fiber 4' that causes short-circuit to cause mechanical break of the carbon fiber 4' or move the carbon fiber 4' that causes short-circuit. In addition, a method involving applying a voltage between the first electrode 3 and the second electrode 2 can be employed.

Hereinafter, an example in which the step of removing the carbon fiber 4' that causes short-circuit is performed by applying the voltage having the polarity reverse to that in driving between the first electrode 3 and the second electrode 2 will be described. A more preferable example as described below is the case where the voltage is applied between the first electrode 3 and the second electrode 2 in an atmosphere containing a gas which chemically reacts with the carbon fiber. The gas which chemically reacts with the carbon fiber is not necessarily introduced in the atmosphere.

Figure 2A:
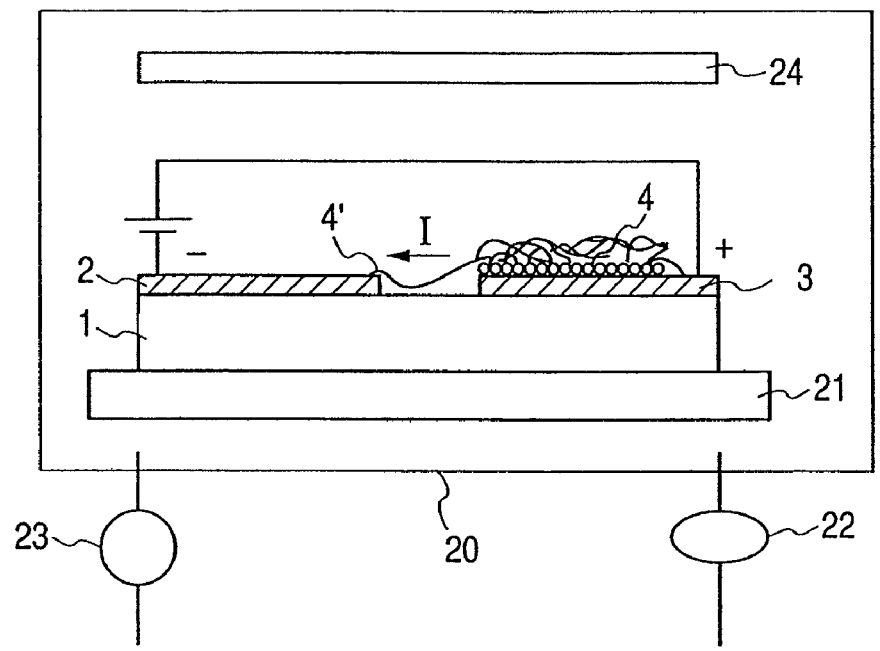
FIGS. 2A and 2B are schematic views showing an apparatus used for a step of removing a carbon fiber that causes short-circuit, according to the present invention.
Figure 2B:
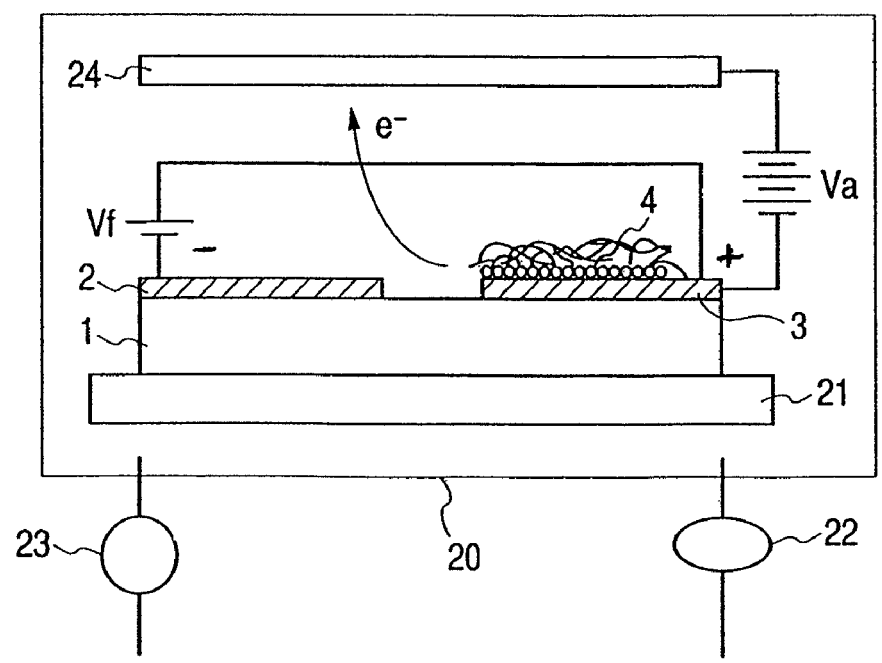

First, the substrate 1 on which the first and second steps are completed is placed in a vacuum apparatus 20 shown in FIGS. 2A and 2B and the vacuum apparatus 20 is sufficiently evacuated by using an evacuation apparatus 23. In FIGS. 2A and 2B, reference numeral 20 denotes the vacuum apparatus, 21 denotes a substrate holder, 22 denotes a gas introduction valve, 23 denotes the evacuation apparatus, and 24 denotes an anode (also referred to as a "third electrode"). The same references are provided for the same members as those in FIGS. 1A to 1D.

Next, a substance that chemically easily reacts with the carbon fibers 4 is introduced through the gas introduction valve 22.

Here, the substance that chemically reacts with the carbon fibers 4 is, for example, $O_2$, CO, or $H_2O$. The gas that chemically easily reacts with the carbon fibers is suitably a mixture of a gas selected from $H_2O$, $O_2$, and $CO_2$ and an $H_2$ gas. Although a pressure for introducing the gas containing the substance is changed according to a kind of gas, the pressure is preferably $1\times10^{-4}$ Pa or more.

Next, after the introduction of the gas, the voltage is applied between the second electrode 2 and the first electrode 3 such that the potential of the second electrode 2 becomes lower than the potential of the first electrode 3. As a result, a current (I) flows into the carbon fiber 4' that causes short-circuit. Then, the above mentioned reactions (1) to (5) by virtue of Joule heat or the like which are generated in the short-circuit portion short-circuited through the carbon fiber 4', with the result that the carbon fiber 4' that causes short-circuit is removed. FIG. 2A is a schematic view showing the electron-emitting device at the start of voltage application. FIG. 2B is a schematic view showing the electron-emitting device after the carbon fiber that causes short-circuit is removed (after repair processing). A device voltage Vf applied by a potential applying unit Vf is also represented in FIG. 2B.

During the step of removing the carbon fiber 4' that causes short-circuit, it is preferable that the above-mentioned reactive gas be continuously introduced through the gas introduction valve 22 and simultaneously a reaction product produced by the reaction between the reactive gas and the carbon fiber 4' be removed by using the evacuation apparatus 23. Depending on the reaction, a reversible change occurs in some cases. Therefore, it is preferable that the reaction product be removed from a reaction system without any delay.

In the above-mentioned example, the substrate is placed into the vacuum apparatus 20 in order to perform the voltage application in the low pressure atmosphere. The step of removing the carbon fiber 4' that causes short-circuit can be also performed by applying the voltage between the first electrode 3 and the second electrode 2 in, for example, a normal pressure (atmospheric pressure) atmosphere. According to a typical example in the case of the normal pressure, for example, the step of removing the carbon fiber 4' that causes short-circuit can be performed by applying the voltage between the first electrode and the second electrode in air. In this case, oxygen in air corresponds to the gas that chemically reacts with the carbon fiber 4'. When the oxygen in air is used, the "removal" in the present invention can be more easily performed at lower cost.

Figure 4:
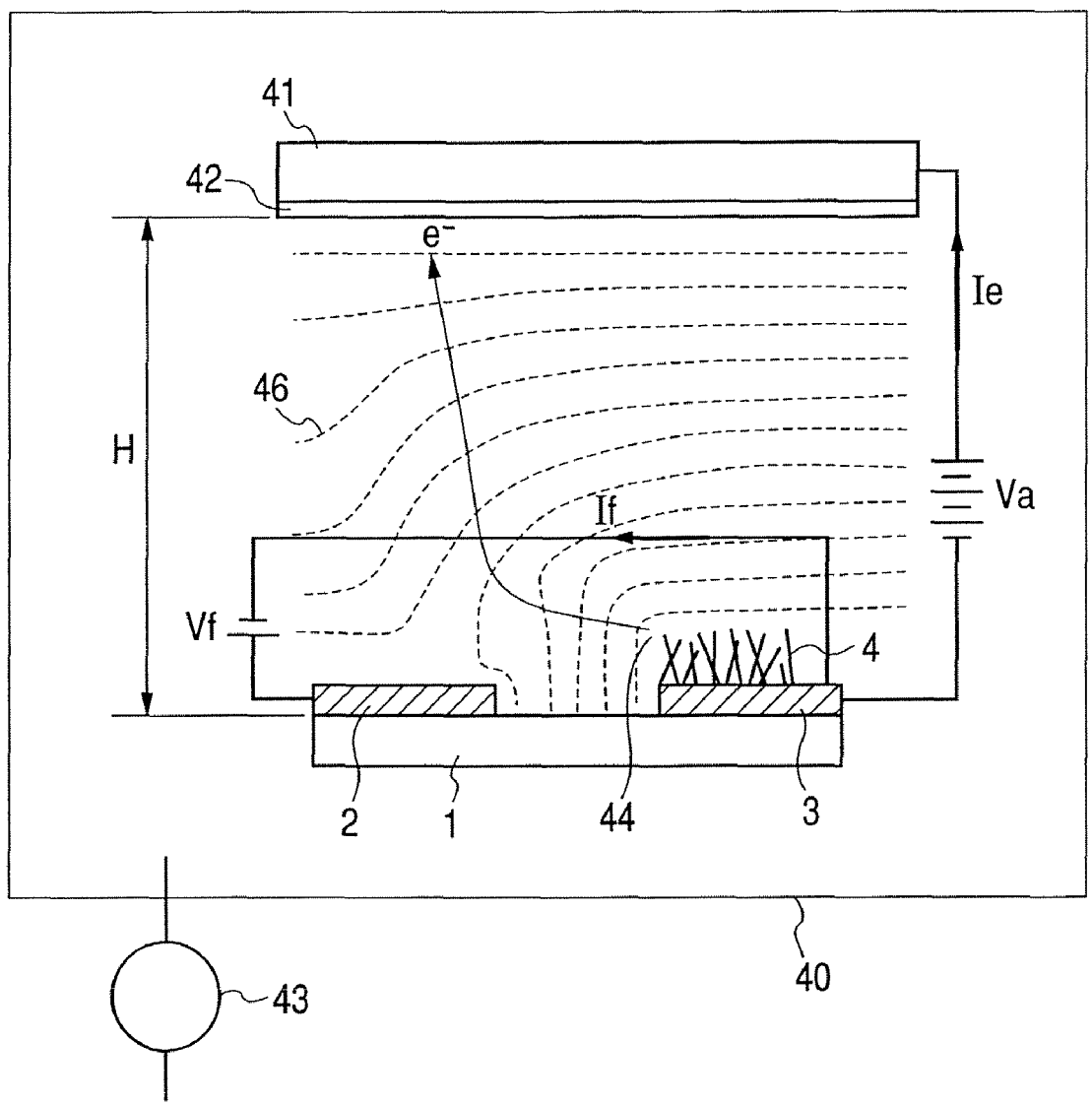
FIG. 4 is a schematic view showing a state of the lateral type electron-emitting device according to the present invention in driving.

The characteristic and operation of the electron-emitting device obtained through the above-mentioned steps will be described with reference to FIGS. 4 and 5. In FIG. 4, reference numeral 40 denotes a vacuum apparatus, 41 denotes an anode, 42 denotes a phosphor which is a light emitting member, 43 denotes an evacuation apparatus, 44 denotes an electric field concentration point, and 46 denotes an equipotential line.

First, the electron-emitting device obtained through the above-mentioned respective steps is placed in the vacuum apparatus 40 shown in FIG. 4. The vacuum apparatus 40 is sufficiently evacuated up to the order of $10^{-5}$ Pa by using the evacuation apparatus 43. Then, as shown in FIG. 4, the anode 41 is set at a height H of several mm from the substrate 1. An anode voltage Va which is a high voltage of several kV is applied between the cathode electrode 3 and the anode 41 by using a high voltage power source. In this example, the phosphor 42 covered with an electroconductive film is provided on the anode 41.

A device voltage Vf (applied by potential applying unit Vf) which is a pulse voltage of about several tens V is applied between the second electrode 2 and the first electrode 3. As a result, a device current If and an electron emission current Ie can be measured. At this time, the equipotential line 46 is formed as shown in FIG. 4. An electric field concentration point is typically a location which is indicated by reference numeral 44. The electric field concentration point is a region of the carbon fibers 4 which is closest to the anode 41 and located on the inner side of a gap between the second electrode 2 and the first electrode 3. It is expected that electrons be emitted from the carbon fiber 4 located near the electric field concentration point 44 at a high priority.

Figure 5:
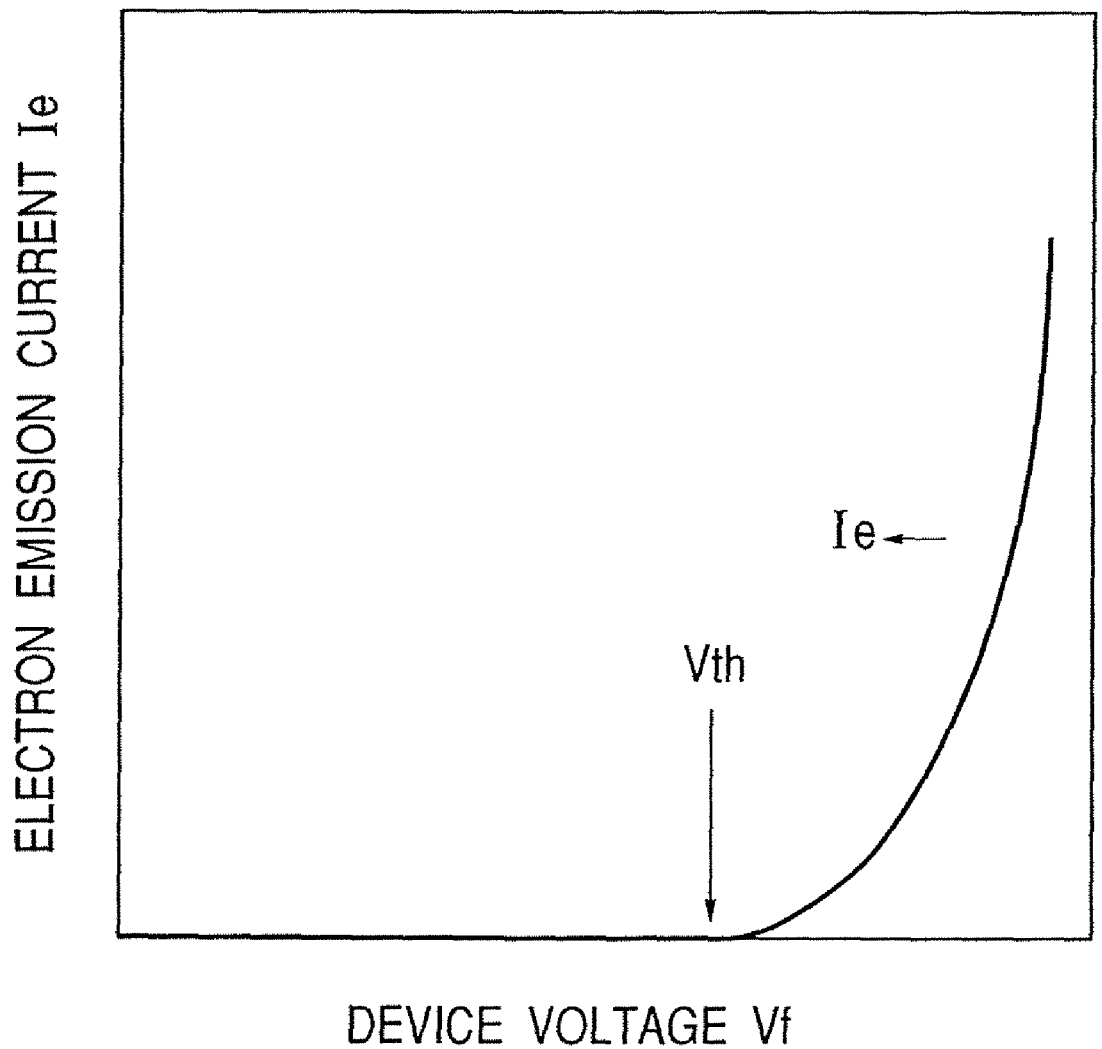
FIG. 5 is a graph showing an electron emission characteristic of the electron-emitting device according to the present invention.

As shown in FIG. 5, with respect to the characteristic of the electron emission current Ie of the electron-emitting device, Ie suddenly increases at a threshold value Vth of the applied voltage (device voltage Vf). Significant reductions in Ie and electron emission efficiency are not observed.

In the case of an electron-emitting device manufactured without performing the step of removing the carbon fiber 4' that causes short-circuit as described above, a variation in Ie (emission current) is small. However, it is observed that a value of Ie is extremely small and the electron emission efficiency is low. Even when a large number of electron-emitting devices are manufactured, a variation between the electron emission characteristics of the respective electron-emitting devices is large.

Thus, when the step of removing the carbon fiber that causes short-circuit, which is one of the features of the present invention, is not performed, a significant difference is caused between the electron emission characteristics of the electron-emitting devices. This may be caused by a significant difference between the electron emission characteristic of an electron-emitting device having a portion in which electrodes are likely to short-circuit and the electron emission characteristic of an electron-emitting device having a portion in which electrodes are hard to short-circuit because of a variation in shapes of carbon fibers serving as electron-emitting members.

An electron source manufacturing method of the present invention is applied to a method of manufacturing an electron source in which a plurality of electron-emitting devices manufactured by means of the electron-emitting device manufacturing method are arranged on the same substrate.

The electron source manufacturing method of the present invention includes:

a first step of preparing a plurality of units, each of which includes a first electrode having a plurality of fibers each containing carbon and a second electrode located apart from the first electrode;

a second step of detecting, of the plurality of units, a unit in which the first electrode and the second electrode are short-circuited through a fiber containing carbon; and a third step of removing the fiber containing carbon through which the first electrode and the second electrode are short-circuited in the unit in which the first electrode and the second electrode are short-circuited through the fiber containing carbon.

That is, more specifically, a plurality of units each of which includes the first electrode 3 and the second electrode 2 shown in FIGS. 1A to 1D are arranged on the substrate 1. As described above, the plurality of carbon fibers 4 are located on the first electrode 3 in each of the units. Next, the presence or absence of the carbon fiber 4' through which the first electrode 3 and the second electrode 2 are short-circuited is checked. The step of removing the carbon fiber 4' that causes short-circuit is performed based on a result obtained by checking.

Hereinafter, an example of the electron source manufacturing method of the present invention to which the manufacturing method shown in FIGS. 1A to 1D is applied will be described with reference to FIG. 6.

Figure 6:
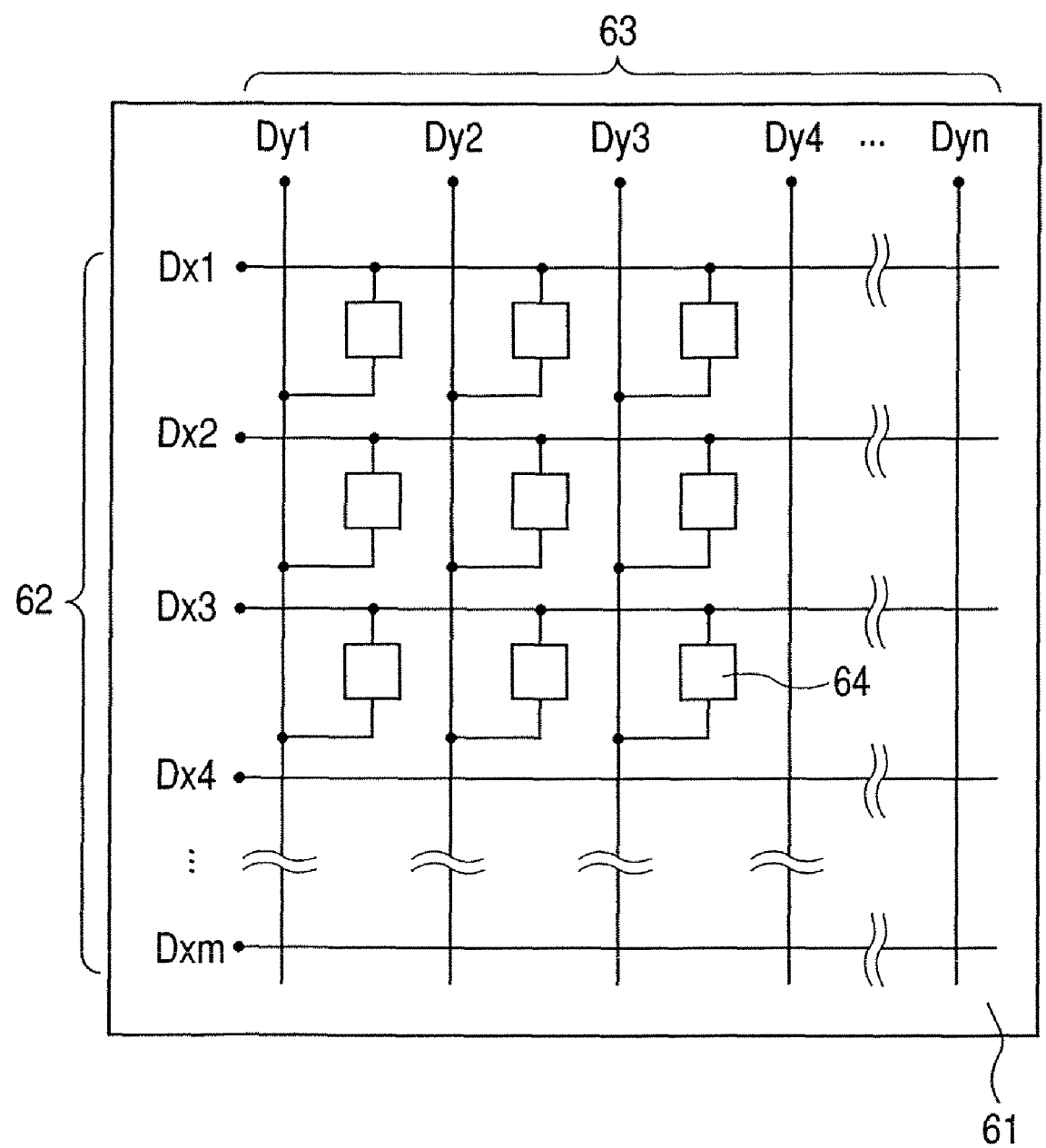
FIG. 6 is a diagram showing an example of an electron source according to the preset invention.

In FIG. 6, the electron source includes an electron source base 61, X-directional wirings 62, Y-directional wirings 63, and electron-emitting devices 64.

The X-directional wirings 62 are m wirings Dx1, Dx2, ..., Dxm and can be made from an electroconductive material which is obtained by means of a vacuum evaporation method, a printing method, a sputtering method, or the like. The material, film thickness, and width of each of the wirings are designed as appropriate. The Y-directional wirings 63 are n wirings Dy1, Dy2, ..., Dyn and can be formed as in the case of the X-directional wirings 62.

An interlayer insulating film which is not shown is provided between the m X-directional wirings 62 and the n Y-directional wirings 63 and electrically insulates therebetween. Here, m and n each are a positive integer. The interlayer insulating film which is not shown can be made from an $SiO_2$ film or the like which is formed by means of a vacuum evaporation method, a printing method, a sputtering method, or the like. For example, the interlayer insulating film is formed on the entire surface of the electron source base 61 including the m X-directional wirings 62 or formed on a part of the electron source base 61 in a desirable shape. In particular, the film thickness, material, and manufacturing method of the interlayer insulating film are set as appropriate so that the film can withstand potential differences at intersections between the X-directional wirings 62 and the Y-directional wirings 63.

The first electrode and the second electrode (which are not shown) composing each of the electron-emitting devices 64 are electrically connected with the X-directional wirings 62 and the Y-directional wirings 63, respectively.

Assume that the number of X-directional wirings and the number of Y-directional wirings increase in the matrix wiring structure shown in FIG. 6. When all the electron-emitting devices 64 on the matrix are simultaneously selected and a voltage is simultaneously applied to each of the electron-emitting devices to perform the step of removing the carbon fiber that causes short-circuit according to the present invention, a variation between voltages applied to the respective electron-emitting devices 64 occurs owing to voltage drop in some cases.

Therefore, it is preferable to perform the removal step of the present invention using a method involving applying a voltage to each line (for example, each group including electron-emitting devices commonly connected with an X-directional wiring) or the removal step of the present invention using a method involving applying a voltage to each electron-emitting device. Alternatively, it is preferable that all the electron-emitting devices be divided into some groups and the removal step of the present invention be successively performed for each group. The group may be a group including electron-emitting devices connected with some adjacent X-directional wirings (or Y-directional wirings). The group may be a group including electron-emitting devices connected with some X-directional wirings (or Y-directional wirings) which are not adjacent to one another. The group may be a group including electron-emitting devices connected with some X-directional wirings and some Y-directional wirings.

Here, the example of the removal step of the present invention using a method involving applying a voltage to each of the electron-emitting devices will be described. However, it is possible that the removal step of the present invention using the voltage applying method is not performed on all the electron-emitting devices. In this case, an electron-emitting device in which short-circuit occurs through a carbon fiber is determined in advance by checking and the removal step of the present invention is performed on only the determined electron-emitting device.

When the electron-emitting device in which short-circuit occurs through the carbon fiber is to be determined, it is preferable to measure electrical characteristics of the respective electron-emitting devices 64 before the removal step of the present invention. Whether or not the removal step of the present invention is performed can be determined based on data obtained by the measurement. Which electron-emitting device is to be subjected to the removal step of the present invention can be also determined base on the data.

In the case where the electrical characteristics are measured (monitored), for example, currents (current flowing between the first electrode and the second electrode and/or current flowing between the first electrode and the anode) generated when a voltage is applied between the first electrode and second electrode (and the first electrode and the anode) of each of the electron-emitting devices may be measured.

The removal step of the present invention is performed on all the electron-emitting devices or an electron-emitting device determined on the basis of the measured electrical characteristics.

Next, a specific method in the case where the removal step of the present invention is performed for each line (in line sequence) as described above will be described.

For example, the n Y-directional wirings Dy1, Dy2, ..., Dyn are connected with a common line (For example, a GND line). A positive potential to a potential of the Y-directional wirings is applied to the X-directional wiring Dx1 to perform the removal step of the present invention using the voltage applying method on electron-emitting devices commonly connected with the Dx1. In this case, the Y-directional wirings are preferably connected with the second electrode (control electrode). Then, a voltage is applied to Dx2 to perform the removal step of the present invention using the voltage applying method on electron-emitting devices commonly connected with the Dx2. In the same manner, Dx3, Dx4, ..., Dxm are selected in succession and the removal step of the present invention using the voltage applying method is performed for each X-directional wiring. Thus, the influence of voltage drop can be reduced. When an X-directional wiring is selected and a voltage is applied thereto, it is preferable that other X-directional wirings which are not selected be not floated but set to a predetermined potential. More preferably, the X-directional wirings which are not selected are preferably set to a potential equal to that of the Y-directional wiring.

Here, the example in which the removal step of the present invention is performed on the electron-emitting devices connected with the single X-directional wiring has been described. The removal step of the present invention may be performed on some of the electron-emitting devices connected with the single X-directional wiring. That is, it is also possible that the removal step of the present invention is not performed on all the electron-emitting devices but performed on only a desirable electron-emitting device.

Next, when the removal step of the present invention is performed for each electron-emitting device, an individual electron-emitting device is selected to obtain a state where a voltage is separately applied. The electron-emitting devices 64 are successively subjected to the removal step of the present invention one by one. According to such a method, the influence of voltage drop caused by wiring is small. However, a time required for the removal step is proportional to the number of electron-emitting devices. Therefore, the number of electron-emitting devices on which the removal step is simultaneously performed and the group on which the removal step is simultaneously performed can be determined based on a size of the electron source and the number of electron-emitting devices which are subjected to the removal step.

In the manufacturing method of the present invention, the example in which the carbon fibers are selectively located on only the first electrode 3 has been described. In this example, any patterning step for selectively locating the carbon fiber is required. Thus, when the voltage applying method is used in the removal step of the present invention, the patterning step can be also omitted. For example, the carbon fibers are not selectively located on only the first electrode 3 but located on the first electrode 3 and the second electrode 2 (carbon fibers are located on at least one electrode without patterning with particularly high precision). After that, the voltage applying step is performed. An electron-emitting device is driven at a voltage having polarity reverse to that of a voltage applied in the voltage applying step. In other words, an electrode to which a higher potential is applied in the voltage applying step is set to a low potential (that is, an electron emission side) in driving. Therefore, when the carbon fibers are located, the patterning step can be simplified. Such a manner can be also applied to the electron source manufacturing method as a matter of course.

Figure 7:
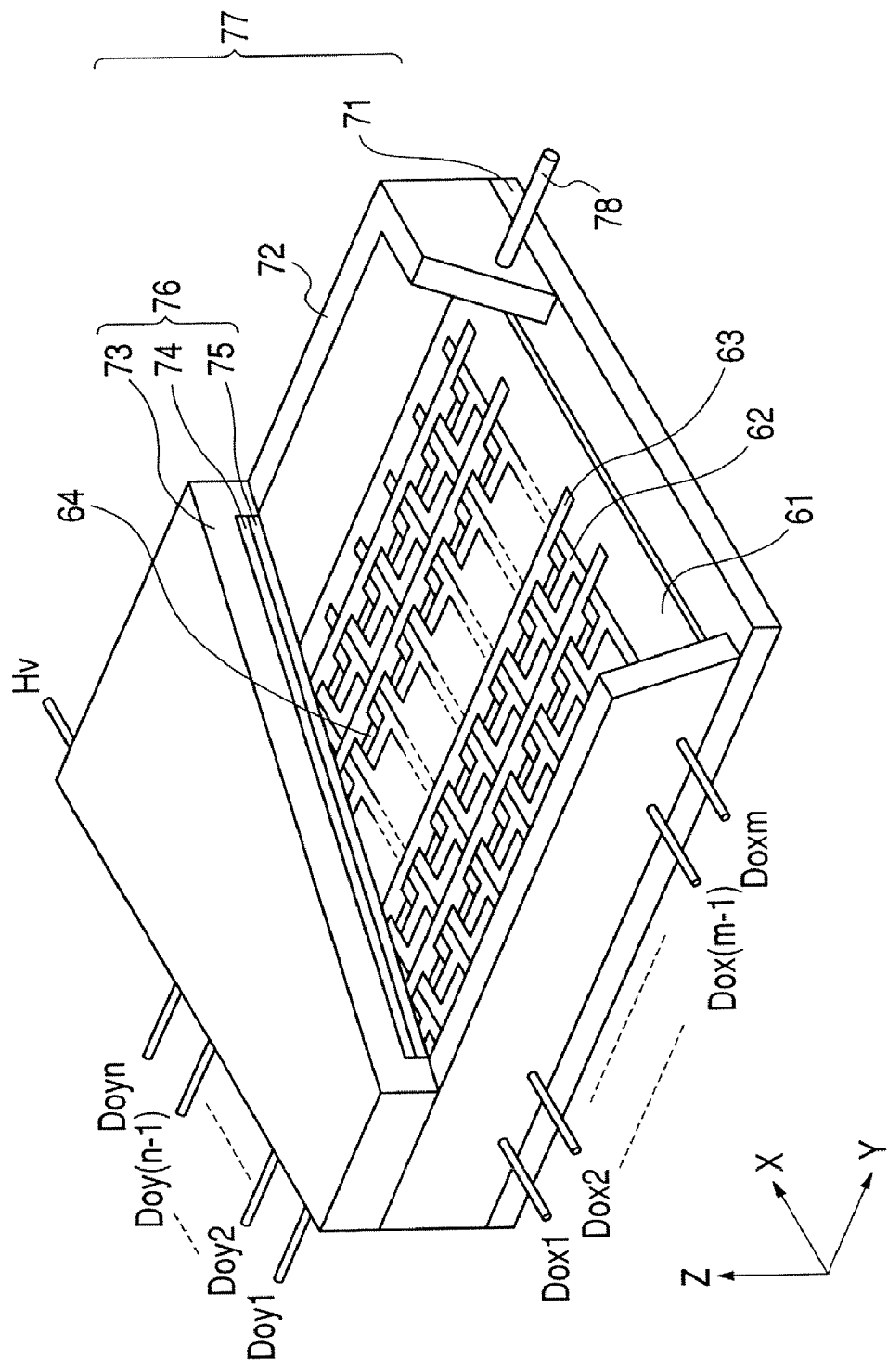
FIG. 7 is a schematic view showing an example an image-forming apparatus according to the present invention.

Next, an image display apparatus constructed using an electron source having a passive matrix arraignment will be described with reference to FIG. 7. FIG. 7 is a schematic view showing an example of a display panel of the image display apparatus.

In FIG. 7, reference numeral 61 denotes an electron source base on which a plurality of electron-emitting devices manufactured by means of the manufacturing method of the present invention are arranged, 71 denotes a rear plate onto which the electron source base 61 is fixed, and 76 denotes a face plate obtained by forming a phosphor film 74, a metal back 75, and the like on the inner surface of a glass base 73. Reference numeral 72 denotes a support frame. The support frame 72 is bonded to the rear plate 71 and the face plate 76 using frit glass or the like. An envelope 77 is baked for seal bonding, for example, in air, a vacuum, or a nitrogen atmosphere at a temperature of 400° C. to 500° C. for 10 minutes or longer. When the removal step of the present invention is performed after the formation of the envelope 77 as described later, a gas introduction tube 78 and an evacuation tube 79 are required. However, in other cases, the gas introduction tube 78 and the evacuation tube 79 are not necessarily provided.

As described above, the envelope 77 is composed of the face plate 76, the support frame 72, and the rear plate 71. The rear plate 71 is provided to reinforce mainly the strength of the electron source base 61. Therefore, when the electron source base 61 itself has a sufficient strength, a separate rear plate 71 can be omitted. That is, the support frame 72 may be directly bonded for sealing to the electron source base 61 to obtain the envelope 77 composed of the face plate 76, the support frame 72, and the electron source base 61. On the other hand, when supporters (not shown) which are called spacers are provided between the face plate 76 and the rear plate 71, the envelope 77 having a sufficient strength to an atmospheric pressure can be constructed.

When the removal step of the present invention is performed after the formation of the envelope 77, a reactive gas can be also introduced to the inner portion of the envelope 77 through the gas introduction tube 78. The introduced reactive gas and a reaction product are always removed through the evacuation tube 79.

An information displaying and playing apparatus can be constructed using the envelope (display panel) 77 of the present invention as described with reference to FIG. 7.

More specifically, the information displaying and playing apparatus includes a receiving device for receiving broadcast signals on television broadcast or the like, a tuner for selecting the received signals, and the envelope 77. At least one selected from video information, character information, and voice information, which are included in the selected signal, is outputted to the envelope (display panel) 77 and then displayed and/or played thereon. Therefore, the information displaying and playing apparatus such as a television set can be constructed. Of course, when a broadcast signal is encoded, the information displaying and playing apparatus of the present invention can further include a decoder. A voice signal is outputted to voice playing means such as a speaker which is separately provided and then played in synchronization with the video information and the character information which are displayed on the envelope (display panel) 77.

With respect to a method of outputting the video information or the character information to the envelope (display panel) 77 to display and/or play the video information or the character information thereon, for example, there is the following manner. First, an image signal corresponding to each pixel of the envelope (display panel) 77 is generated from the received video information and character information. The generated image signal is inputted to a drive circuit of the envelope (display panel) 77. A voltage applied from the drive circuit to each electron-emitting device of the envelope (display panel) 77 is controlled based on the image signal inputted to the drive circuit to display an image.

Figure 12:
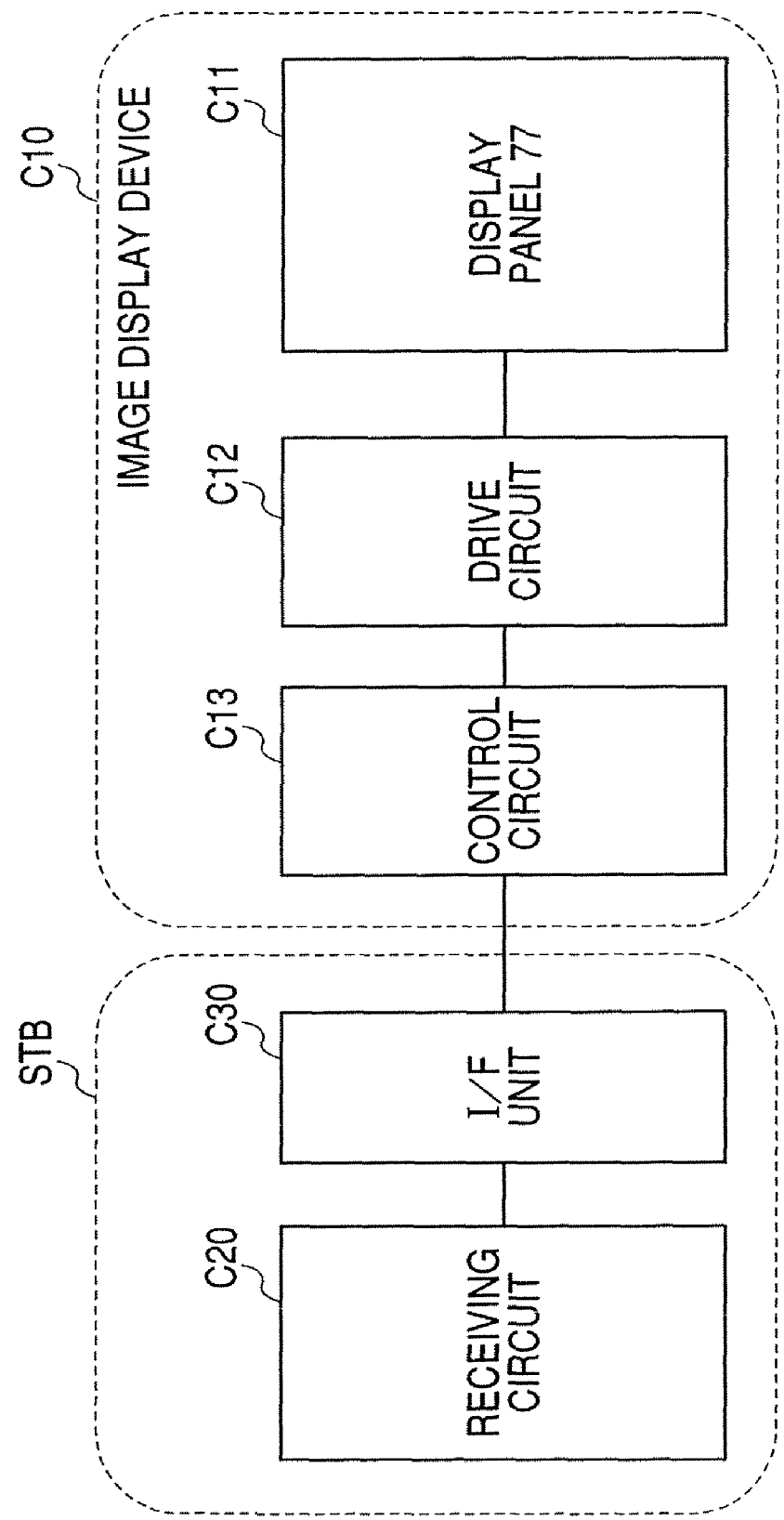
FIG. 12 is a block diagram showing a television apparatus according to the present invention.

FIG. 12 is a block diagram showing a television apparatus according to the present invention. A receiving circuit is composed of a tuner, a decoder, and the like. The receiving circuit receives a television signal on satellite broadcasting or terrestrial broadcasting, a signal on data broadcasting through a network, or the like and outputs decoded video data to an I/F unit. The I/F unit converts the video data into a display format of an image display apparatus and outputs image data to the envelope (display panel) 77. The image display apparatus includes the envelope (display panel) 77, a drive circuit, and a control circuit. The control circuit performs image processing such as correction processing suitable for the display panel on the image data outputted from the IF unit and outputs the processed image data and various control signals to the drive circuit. The drive circuit outputs a drive signal to each of the wirings (see Dox1 to Doxm and Doy1 to Doyn in FIG. 7) of the envelope (display panel) 77 based on the image data outputted from the control circuit, thereby displaying a video image. The receiving circuit and the I/F unit may be stored in a case which serves as a set-top box (STB) and is separated from the image display apparatus. The receiving circuit and the I/F unit may be stored in the same case as that storing the image display apparatus.

The image display apparatus described here is an example of an image display apparatus to which the present invention can be applied. Therefore, various modifications can be made based on technical ideas of the present invention. The image display apparatus of the present invention can be also used as a display apparatus for a television conference system, a computer, or the like.

An image-forming apparatus according to the present invention can be also used as a display apparatus for television broadcasting or a display apparatus for a television conference system, a computer, or the like.

Hereinafter, specific embodiments of the present invention will be described in detail.

Embodiment 1

An example in which a carbon fiber that causes short-circuit is removed by applying a voltage having polarity reverse to that in driving between the first electrode and second electrode of an electron-emitting device is described as Embodiment 1.

FIGS. 3A and 3B are the plan view and cross sectional view of an electron-emitting device manufactured in this embodiment. Hereinafter, steps of manufacturing the electron-emitting device according to this embodiment will be described in detail with reference to FIGS. 1A to 1D.

(First Step)

A quartz substrate was used as the substrate 1 and sufficiently washed. After that, a Ti layer having a thickness of 5 nm and a Pt layer having a thickness of 30 nm were successively formed as the first electrode 3 and the second electrode 2, respectively, by means of a sputtering method.

Next, a resist pattern was formed by means of a photo lithography process using a positive type photo resist. Then, the Pt layer and the Ti layer were dry-etched using a patterned photo resist as a mask to form the control electrode 2 and the cathode electrode 3 with an electrode gap of 5 μm therebetween (FIG. 1A).

(Second Step)

Next, a Cr film having a thickness of about 100 nm was deposited on the entire surface by EB evaporation. A resist pattern was formed by means of a photo lithography process using a positive type photo resist. Then, an opening corresponding to a region on which the carbon fibers were to be located (100 μm square) was formed in a patterned photo resist. The Cr film which was exposed in the opening was removed by using an etching solution of cerium nitrate to expose the cathode electrode in the opening. The photo resist was removed and then a complex solution prepared by adding isopropyl alcohol or the like to a Pd complex was applied onto the entire surface by means of spin coating.

After the application of the complex solution, heat treatment was performed in air at 300° C. to form a palladium oxide layer having a thickness of about 10 nm on the first electrode 3. Then, the Cr film was removed by using an etching solution of cerium nitrate.

Then, heat treatment was performed in a 2% hydrogen stream diluted with nitrogen at 200° C. In this stage, a large number of Pd particles (catalytic particles 6) were formed on the surface of the cathode electrode 3 (FIG. 1B).

Subsequently, heat treatment was performed in a 1% acetylene stream diluted with nitrogen at 500° C. for 20 minutes. When the resultant substrate 1 was observed using a scanning electron microscope (SEM), a large number of carbon fibers 4, each of which had a diameter of about 20 nm to 50 nm and was extended with bending in a fiber shape were formed on the region on which the Pd particles were located (FIG. 1C).

In this time, an average thickness of a layer of the carbon fibers 4 became about 2 μm. As schematically shown in FIG. 1C, a state where the carbon fiber 4' was partly in contact with the control electrode 2 was observed on an SEM image. When a voltage of 10 V was applied between the cathode electrode 3 and the control electrode 2 with a state where the control electrode 2 had a potential higher than that of the cathode electrode 3, a current flowing therebetween was about 5 μA.

(Third Step)

The resultant electron-emitting device was placed in the vacuum apparatus 20 shown in FIG. 2. The vacuum apparatus 20 was evacuated up to $1\times10^{-5}$ Pa by using the evacuation apparatus 23. After that, an $O_2$ gas was introduced into the vacuum apparatus 20 through the gas introduction valve 22 until the degree of vacuum thereof reached $1\times10^{-4}$ Pa. The potential of the gate electrode 2 was set to a value lower than the potential of the cathode electrode 3. A pulse voltage having a peak value of 25 V was repeatedly applied. The voltage application was continued for 10 minutes. When a short-circuited portion was observed using an SEM again, it was shown that the short-circuited portion was removed (FIG. 1D).

The electron-emitting device formed through the above-mentioned steps was placed in the vacuum apparatus 40 shown in FIG. 4. The vacuum apparatus 40 was sufficiently evacuated up to $2\times10^{-6}$ Pa by using the evacuation apparatus 43. Then, as shown in FIG. 4, the anode voltage Va (=10 kV) was applied to the anode 41 set at the height H (=2 mm) from the substrate 1.

In this time, a pulse voltage which was the device voltage Vf (=20 V) was applied to the electron-emitting device to measure the device current If and the electron emission current Ie which flowed therethrough. In the measurement, the pulse voltage of 20 V was applied between the cathode electrode 3 and the control electrode 2 with a state where the control electrode 2 had a potential higher than that of the cathode electrode 3.

Figure 10:
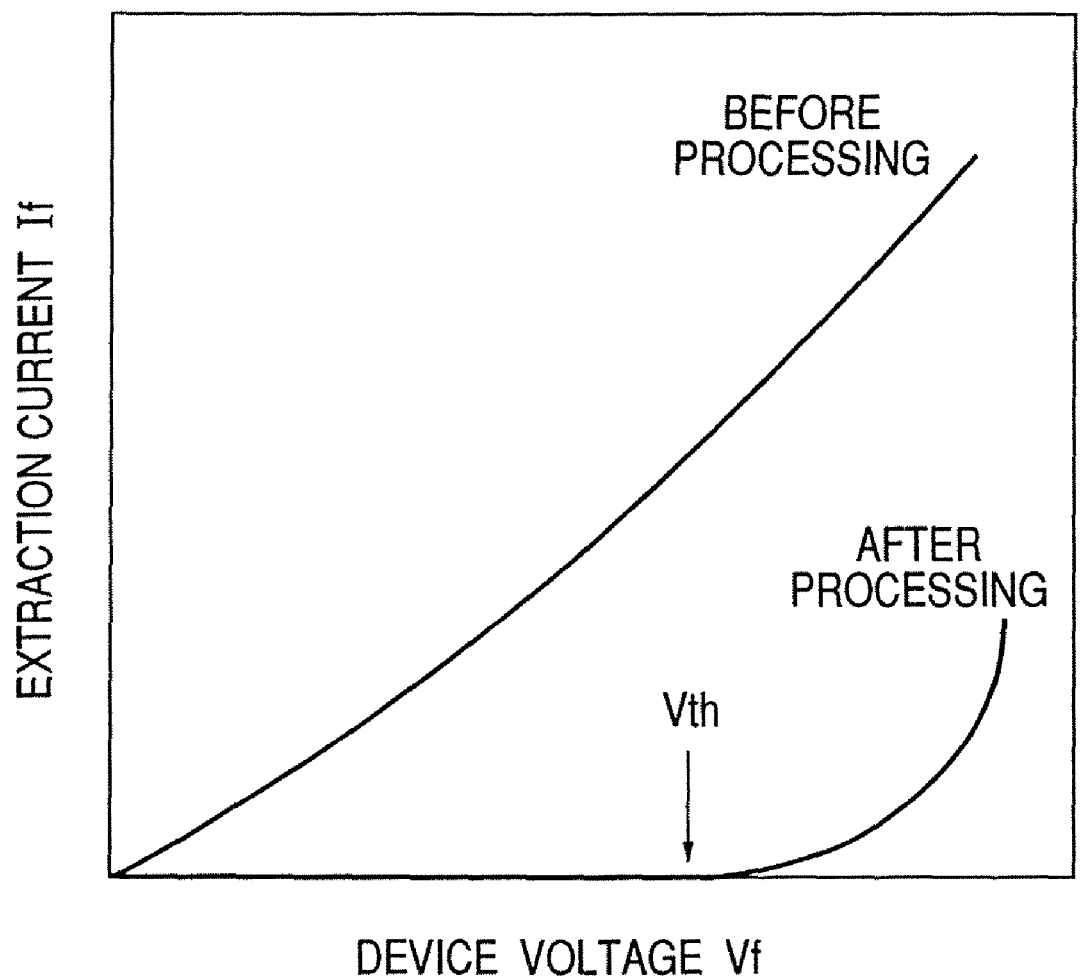
FIG. 10 is a graph showing electron emission characteristics before and after processing for removing the carbon fiber that causes short-circuit, according to the present invention.

As shown in FIG. 5, with respect to the characteristic of Ie of the electron-emitting device, Ie suddenly increased at a threshold value Vth of the applied voltage. When Vf was 15 V, the electron emission current Ie of about 1 μA was measured. Therefore, electron emission efficiency was high, so that a preferable electron emission characteristic was obtained. On the other hand, although the characteristic If was similar to the characteristic of Ie, a value of Ie was much larger than a value of If. A mechanism of the removal step in this embodiment will be described with reference to FIG. 10. FIG. 10 shows a change in device characteristic before and after removal processing.

As shown in FIG. 10, with respect to the electron-emitting device before processing, a nearly linear characteristic was exhibited between If and Vf in a low electric field region. As described above, when a bias voltage reverse to that in driving was applied between the cathode electrode 3 and the control electrode 2 in an atmosphere containing an $O_2$ gas, If of the electron-emitting device suddenly decreased. Then, a voltage applied to the electron-emitting device was gradually increased. The removal processing was performed until a current flowing between the cathode electrode 3 and the control electrode 2 reached a value which could not be detected at the threshold voltage Vth in FIG. 10. Next, the $O_2$ gas was removed and then the device characteristic was examined again. As a result, the characteristic was changed into a characteristic in which electrons were emitted at the vicinity of the threshold voltage Vth. In this time, there was no leak current. Thus, an expected result that the short-circuit portion was removed by the removal step was obtained from the electron emission characteristic.

Embodiment 2

In Embodiment 2, an image display apparatus was manufactured using an matrix electron source produced by connecting a plurality of electron-emitting devices with a plurality of X-directional wirings and a plurality of Y-directional wirings. In this embodiment, an example in which the removal step was performed for each X-directional wiring will be described with reference to FIGS. 6 and 7.

In this embodiment, the X-directional wirings 62 were 400 wirings. Each of the wirings formed by means of an evaporation method had a thickness of about 1 μm and a width of 300 μm and contained Ag as a main component. The Y-directional wirings 63 were 600 wirings, each of which had a thickness of about 0.5 μm and a width of 100 μm and was formed by the same manner as that for the X-directional wirings 62. The interlayer insulating film which was not shown was provided at the intersections between the X-directional wirings 62 and the Y-directional wirings 63 and electrically insulated therebetween. The interlayer insulating film (not shown) made from an $SiO_2$ layer having a thickness of about 0.8 μm was formed by means of a sputtering method or the like.

The cathode electrode and the control electrode which compose the electron-emitting device 64 and were not shown were connected with one of the X-directional wirings 62 and one of the Y-directional wirings 63. In this embodiment, the Y-directional wiring 63 was connected with the cathode electrode and the X-directional wiring 62 was connected with the control electrode.

Fundamentally, each of the electron-emitting devices was formed by means of the same manufacturing method as that in Embodiment 1 and had the same structure as that in Embodiment 1. Hereinafter, a step of removing a carbon fiber that causes short-circuit in this embodiment will be described.

In this embodiment, the removal step was performed in air. When oxygen in air was used, the carbon fiber that causes short-circuit can be more easily removed at lower cost.

First, the 600 Y-directional wirings Dy1, Dy2, . . . , Dy600 were commonly set to an earth potential (0 V). A pulse having a peak value of minus 25 V was applied to Dy1 to selectively perform the removal step on a carbon fiber that caused short-circuit in the electron-emitting devices 64 connected with Dx1. Subsequently, Dx2 was selected and a potential equal to the potential applied to Dx1 was applied to Dx2 to selectively perform the removal step on the electron-emitting devices 64 connected with Dx2. Similarly, Dx3, Dx4, . . . , Dx400 were selected in succession and the removal step was successively performed for each X-directional wiring.

After the completion of the removal step, a voltage lower than that in driving was applied to each of the electron-emitting devices to check the presence or absence of a leak current. As a result, a leak current was not detected in all the electron-emitting devices.

Next, the face plate 76 obtained by forming the phosphor film 74, the metal back 75, and the like on the inner surface of the glass base 73 was positioned so as to oppose to the electron source having the passive matrix arrangement, which had been subjected to the removal step. Then, the support frame 72 in which a bonding material was provided on each of a portion opposed to the electron source base 61 and a portion opposed to the face plate 76 was located between the electron source base 61 and the face plate 76. The face plate 76, the electron source base 61, and the support frame 72 were placed in a seal bonding furnace whose inner portion can be maintained to a vacuum. Seal bonding and sealing were performed to form the envelope 77 shown in FIG. 7. FIG. 7 shows the rear plate 71 to which the electron source base 61 was fixed. In this embodiment, the electron source base itself also served as the rear plate. In addition, FIG. 7 shows the gas introduction tube 78 and the evacuation tube 79. In this embodiment, the gas introduction tube 78 and the evacuation tube 79 were not provided because the seal bonding and the sealing were performed in a vacuum.

The X-directional wirings 62 and the Y-directional wirings 63 were connected with terminals Dox1 to Doxm and Doy1 to Doyn and led to the outside of the envelope 77.

After the phosphor film 74 had been formed, smoothing processing (generally called "filming") was performed on the inner surface of the phosphor film 74. Then, an Al film was deposited by means of vacuum evaporation or the like to form the metal back 75.

A TV signal was supplied to the envelope 77 obtained thus and an effective voltage of 30 V was applied to each of the electron-emitting devices to display an image on the envelope 77 as an image display apparatus. As a result, a preferable image having high uniformity was obtained.

Embodiment 3

An example in which the removal step was performed on only an electron-emitting device in which short-circuit occurs in a display apparatus serving as an image-forming apparatus including the matrix electron source on which the plurality of electron-emitting devices in Embodiment 2 were arranged will be described in this embodiment.

The electron source shown in FIG. 6 was manufactured as in Embodiment 2. Even in this embodiment, the Y-directional wiring 63 was connected with the cathode electrode and the X-directional wiring 62 was connected with the control electrode.

The electron source was manufactured by the same manufacturing method as that in Embodiment 1 and had the same structure as that in Embodiment 1. Note that the step of removing the carbon fiber that caused short-circuit was not performed. A current-voltage characteristic of each of the electron-emitting devices in such an electron source was measured. As a result, a leak current which might be caused by short-circuit through a carbon fiber was detected in some electron-emitting devices. In this embodiment, the current-voltage characteristic was measured by applying a voltage of 5 V to each of the electron-emitting devices in a vacuum.

The step of removing the carbon fiber that caused short-circuit was performed as follows. A Y-directional wiring and an X-directional wiring which were connected with an electron-emitting device in which a leak current was detected were selected for each electron-emitting device in which a leak current was detected. A voltage was applied to each of the Y-directional wiring and the X-directional wiring in a vacuum and a voltage was separately applied to each of the electron-emitting devices. In this embodiment, the removal step was performed on an electron-emitting device through which a current of 1 µA or more flowed in the measurement of the current-voltage characteristic. In this embodiment, a potential higher than a potential of the cathode electrode 3 by 40 V was applied to the control electrode 2 to perform the removal step.

Thus, the display apparatus shown in FIG. 7 was manufactured as in Embodiment 2 using the matrix electron source produced in this embodiment. As a result, an image having a higher intensity was obtained as compared with the case of the display apparatus in Embodiment 2.

This application claims priority from Japanese Patent Application No. 2003-401421 filed on Dec. 1, 2003, which is hereby incorporated by reference herein.

What is claimed is:

1. A manufacturing method of an electron-emitting device, including a first electrode having a plurality of fibers and a second electrode located at a distance from the first electrode, and emitting an electron into a vacuum space from one or more of fibers not short-circuiting between the first and second electrodes, comprising:
   a step of preparing the first electrode including a plurality of fibers each containing carbon and the second electrode;
   a step of preparing the fibers not short-circuiting between the first and second electrodes by ablating one or more of fibers short-circuiting between the first and second electrodes by flowing a current into the one or more of the fibers,
   wherein the step of preparing the fibers not short-circuiting between the first and second electrodes comprises a step of applying a potential higher than a potential of the second electrode to the first electrode; and
   a step of electrically connecting, to the first and second electrodes, a potential applying unit for applying, to the first electrode, the potential lower than the potential of the second electrode.

2. A manufacturing method of an electron emitting-device according to claim 1, wherein the step of preparing the fibers is performed in an atmosphere containing a gas which reacts with the fibers each containing carbon, and the gas comprises at least one of $O_2$, $H_2O$, and CO.

3. A manufacturing method of an electron-emitting device according to claim 1, wherein the step of applying the potential comprises a step of applying a pulse voltage repeatedly between the first and second electrodes.

4. A manufacturing method of an image display apparatus comprising an electron source and a light emitting member, the electron source including a plurality of electron-emitting devices, the light emitting member emitting light by being impinged on by an electron emitted from each of the electron-emitting devices, wherein each of the electron-emitting devices is manufactured according to claim 1.

5. A manufacturing method of an information displaying apparatus comprising a receiver for outputting at least one of video information, character information, and voice information, which are included in a received broadcast signal, and an image display apparatus connected with the receiver, wherein the image display apparatus is manufactured according to claim 4.

6. A manufacturing method of an electron emitting device emitting an electron into a vacuum space, comprising:
   a step of preparing a first electrode including a plurality of fibers each containing carbon and a second electrode;
   a step of preparing fibers not short-circuiting between the first and second electrodes by ablating thermally one or more of fibers short-circuiting between the first and second electrodes by flowing a current into the one or more of the fibers,
   wherein the step of preparing the fibers not short-circuiting between the first and second electrodes comprises a step of applying a potential higher than a potential of the second electrode to the first electrode; and
   a step of electrically connecting, to the first and second electrodes, a potential applying unit for applying, to the first electrode, the potential lower than the potential of the second electrode.

7. A manufacturing method of an electron-emitting device according to claim 6, wherein the step of preparing the fibers not short-circuiting between the first and second electrodes is performed in an atmosphere containing a gas which reacts with the fibers each containing carbon.

8. A manufacturing method of an electron-emitting device according to claim 7, wherein the gas which reacts with the fibers each containing carbon comprises at least one of $O_2$, $H_2O$, and CO.

9. A manufacturing method of an electron-emitting device according to claim 6, wherein the step of applying the potential comprises a step of applying a pulse voltage repeatedly between the first and second electrodes.

10. A manufacturing method of an image display apparatus comprising an electron source and a light emitting member, the electron source including a plurality of electron-emitting devices, the light emitting member emitting light by being impinged on by an electron emitted from each of the electron-emitting devices, wherein each of the electron-emitting devices is manufactured according to claim 6.

11. A manufacturing method of an information displaying apparatus comprising a receiver for outputting at least one of video information, character information, and voice information, which are included in a received broadcast signal, and an image display apparatus connected with the receiver, wherein the image display apparatus is manufactured according to claim 10.

* * * * *